United States Patent
Hatano et al.

(10) Patent No.: US 9,760,223 B2
(45) Date of Patent: Sep. 12, 2017

(54) INPUT DEVICE

(71) Applicant: ALPS ELECTRIC CO., LTD., Tokyo (JP)

(72) Inventors: Naoyuki Hatano, Miyagi-ken (JP); Tomoki Yamada, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 223 days.

(21) Appl. No.: 14/602,760

(22) Filed: Jan. 22, 2015

(65) Prior Publication Data
US 2015/0212623 A1   Jul. 30, 2015

(30) Foreign Application Priority Data

Jan. 29, 2014   (JP) .................. 2014-013946

(51) Int. Cl.
G06F 3/044 (2006.01)
G06F 3/041 (2006.01)

(52) U.S. Cl.
CPC ............ G06F 3/044 (2013.01); G06F 3/0418 (2013.01); *G06F 2203/04108* (2013.01)

(58) Field of Classification Search
CPC .................. G06F 3/044; G06F 3/0418; G06F 2203/04108
USPC .................................................. 345/173–178
See application file for complete search history.

(56) References Cited

U.S. PATENT DOCUMENTS

| | | | | |
|---|---|---|---|---|
| 2010/0097078 A1* | 4/2010 | Philipp | ................. | G06F 3/0418 324/684 |
| 2015/0049027 A1* | 2/2015 | Singh | ..................... | G06F 3/041 345/173 |

FOREIGN PATENT DOCUMENTS

JP   2012-198607 A   10/2012

* cited by examiner

*Primary Examiner* — Amare Mengistu
*Assistant Examiner* — Gloryvid Figueroa-Gibson
(74) *Attorney, Agent, or Firm* — Brinks Gilson & Lione

(57) ABSTRACT

A sensor unit outputs detection data as the detection result of the approach state of an object at a plurality of detection positions. A noise amount calculation unit calculates noise included in the detection data as the amount of noise. Then, when a filter unit attenuates the noise included in the detection data, the noise attenuation characteristics of a low-pass filtering process are changed depending on the calculated amount of noise such that the attenuation of noise increases as the amount of noise increases and decreases as the amount of noise decreases.

8 Claims, 16 Drawing Sheets

INPUT DEVICE

CLAIM OF PRIORITY

This application claims benefit of priority to Japanese Patent Application No. 2014-013946 filed on Jan. 29, 2014, which is hereby incorporated by reference in its entirety.

BACKGROUND

1. Field of the Disclosure

The present disclosure relates to an input device that is used to input information in an information apparatus, such as a computer or a smart phone, and more particularly, to an input device that specifies a region of an operation surface which an object, such as a finger or a pen, approaches and inputs information on the basis of the specified region.

2. Description of the Related Art

Devices, such as touch pads or touch panels including sensors, which detect the contact position of an object such as a finger or a pen, have been widely spread as input interfaces of information apparatuses including notebook PCs, tablet terminals, and smart phones. There are various types of sensors, which detect the contact position of the object, such as a resistance-film-type sensor and a capacitance-type sensor. In recent years, a capacitance-type sensor, which can respond to a "multi-touch method" for detecting a plurality of contact positions, has come into widespread use.

In a general capacitance-type sensor including a plurality of electrodes, which are arranged in a lattice shape, the capacitance (mutual capacitance) between the electrodes or the capacitance (self-capacitance) between the electrode and the ground is detected. A capacitance-type touch sensor disclosed in Japanese Unexamined Patent Application Publication No. 2012-198607 includes a plurality of X electrodes that are arranged in the X direction and a plurality of Y electrodes that are arranged in the Y direction (FIG. 1). When an operation body, such as a finger, approaches the X electrode (Y electrode), electrostatic coupling between the operation body and the X electrode (Y electrode) is formed and the capacitance of the X electrode (Y electrode) increases. The capacitances of each X electrode and each Y electrode are monitored to detect the approach position of the operation body.

In the input device disclosed in Japanese Unexamined Patent Application Publication No. 2012-198607, a moving average process is performed on the basis of target coordinates and a predetermined number of coordinates acquired before and after the target coordinates and the average value is set to correction coordinates to remove noise. When this noise removal process is performed, for example, the wobble of the coordinates is suppressed even in a high noise environment and an operation error is less likely to occur. However, when the noise removal process, such as the moving average process, is performed for the output signal from the sensor, high-frequency components are attenuated. As a result, a response to the input of the sensor is delayed. In the input device disclosed in Japanese Unexamined Patent Application Publication No. 2012-198607, the same noise removal process as that in a high noise environment is performed in a low noise environment. Therefore, a large delay occurs due to the noise removal process.

SUMMARY

An input device includes: a sensor unit configured to detect an approach state of an object at a plurality of detection positions and to output the detection result as detection data; a positional data calculation unit configured to calculate positional data indicating an approach position of the object on the basis of the detection data at the plurality of detection positions; a filter unit configured to perform at least one of a first process which reduces the influence of noise included in the detection data output from the sensor unit and inputs the detection data to the positional data calculation unit and a second process which reduces the influence of noise included in the positional data output from the positional data calculation unit; and a noise amount calculation unit configured to calculate the amount of noise included in the detection data. The filter unit changes a processing method in at least one of the first process and the second process, depending on the amount of noise calculated by the noise amount calculation unit, such that the amount of reduction in the influence of the noise increases as the amount of noise increases and decreases as the amount of noise decreases.

According to the above-mentioned structure, in the first process which reduces the influence of the noise included in the detection data or the second process which reduces the influence of the noise included in the positional data, the process method is changed such that the amount of reduction in the influence of the noise increases as the amount of noise included in the detection data increases and decreases as the amount of noise decreases.

BRIEF DESCRIPTION OF THE DRAWINGS

FIG. 2A is a timing chart illustrating the details of a period in which positional data is calculated; and FIG. 2B is a timing chart illustrating a period in which the amount of noise of each sampling frequency is set;

FIG. 4A illustrates a state in which noise is input to each detection electrode by capacitance coupling with the finger; and FIG. 4B illustrates the amount of noise calculated for each detection electrode;

FIG. 5A illustrates a case in which the amount of noise is relatively small; and FIG. 5B illustrates a case in which the amount of noise is relatively large;

FIG. 11A is a timing chart illustrating the details of a period in which positional data is calculated; and FIG. 11B is a timing chart illustrating a period in which the amount of noise of each sampling frequency is set;

DESCRIPTION OF THE EXEMPLARY EMBODIMENTS

First Embodiment

Hereinafter, an input device according to a first embodiment of the present invention will be described with reference to the drawings.

Figure 1:
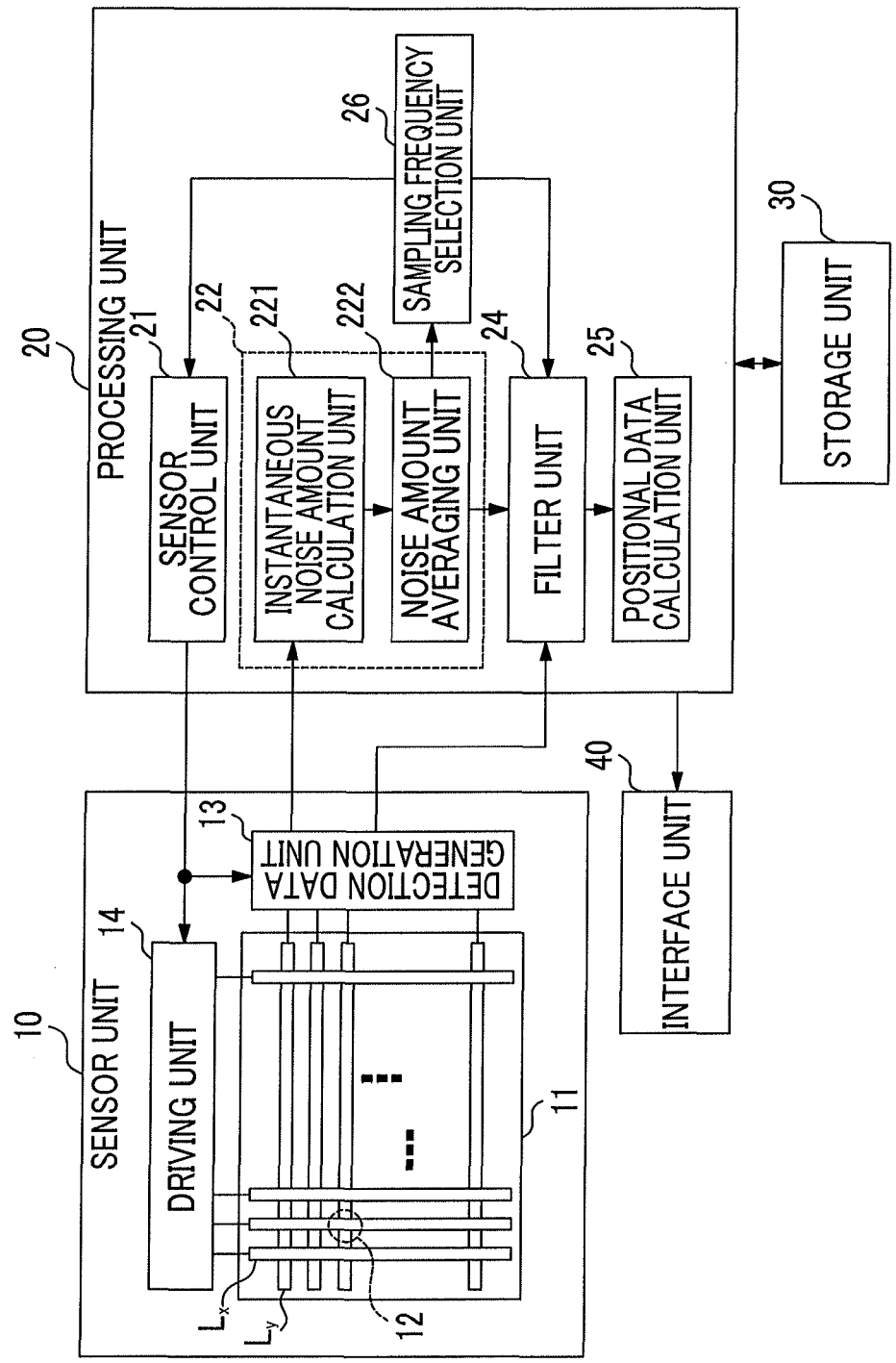
FIG. 1 is a diagram illustrating an example of the structure of an input device according to a first embodiment.

FIG. 1 is a diagram illustrating an example of the structure of the input device according to the first embodiment. The input device illustrated in FIG. 1 includes a sensor unit 10, a processing unit 20, a storage unit 30, and an interface unit 40.

When an object, such as a finger or a pen, approaches the sensor unit 10, the input device according to this embodiment inputs information corresponding to the approach position of the object. In the specification, the term "approach" includes a state in which the object comes into contact with the sensor unit 10 and a state in which the object is close to the sensor unit 10, without coming into contact with the sensor unit 10.

[Sensor Unit]

The sensor unit 10 detects the approach state of the object, such as a finger or a pen, at a plurality of detection positions, which are distributed on an operation surface. For example, the sensor unit 10 includes a sensor matrix 11 in which capacitors (capacitive sensor elements) 12, whose capacitance is changed when the object is approaching, are formed in a matrix, a detection data generation unit 13 that generates detection data corresponding to the capacitance of the capacitor 12, and a driving unit 14 that applies a driving voltage to the capacitor 12.

The sensor matrix 11 includes a plurality of driving electrodes $L_x$, which extend in the vertical direction and a plurality of detection electrodes $L_y$, which extend in the horizontal direction. The plurality of driving electrodes $L_x$ extend in parallel in the horizontal direction and the plurality of detection electrodes $L_y$ extend in parallel in the vertical direction. The plurality of driving electrodes $L_x$ and the plurality of detection electrodes $L_y$ intersect each other in a lattice shape and are insulated from each other. The capacitor 12 is formed as the capacitive sensor element in the vicinity of an intersection portion of the driving electrode $L_x$ and the detection electrode $L_y$. In the example illustrated in FIG. 1, the electrodes ($L_x$ and $L_y$) have a strip shape. However, the electrodes may have any shape (for example, a diamond pattern).

The driving unit 14 is a circuit that applies the driving voltage to each capacitor 12 of the sensor matrix 11. Specifically, the driving unit 14 sequentially selects one driving electrode $L_x$ from the plurality of driving electrodes $L_x$ and periodically changes the potential of the selected one driving electrode $L_x$, under the control of the processing unit 20. When the potential of the driving electrode $L_x$ is changed in a predetermined range, the driving voltage which is applied to the capacitor 12 formed in the vicinity of the intersection point of the driving electrode $L_x$ and the detection electrode $L_y$ is changed in a predetermined range and the capacitor 12 is charged or discharged.

The detection data generation unit 13 generates detection data corresponding to the charge, which is transmitted in each detection electrode $L_y$ when the capacitor 12 is charged or discharged with the application of the driving voltage by the driving unit 14. That is, the detection data generation unit 13 samples the charge which is transmitted in each detection electrode $L_y$ in synchronization with a periodic change in the driving voltage of the driving unit 14 and generates the detection data corresponding to the sampling result.

For example, the detection data generation unit 13 includes a capacitance-voltage conversion circuit (CV conversion circuit) that outputs a voltage corresponding to the capacitance of the capacitor 12 and an analog-digital conversion circuit (AD conversion circuit) that converts an output signal from the CV conversion circuit into a digital signal and outputs the digital signal as the detection data.

The CV conversion circuit samples the charge transmitted in the detection electrode $L_y$ under the control of the processing unit 20 whenever the driving voltage of the driving unit 14 is periodically changed and the capacitor 12 is charged or discharged. Specifically, whenever a positive or negative charge is transmitted in the detection electrode $L_y$, the CV conversion circuit transmits the charge or a charge that is proportional to the charge to a reference capacitor and outputs a signal corresponding to the voltage generated in the reference capacitor. For example, the CV conversion circuit outputs a signal corresponding to the integrated value or average value of the charge that is periodically transmitted in the detection electrode $L_y$ or a charge that is proportional to the charge. The AD conversion circuit converts the output signal from the CV conversion circuit into a digital signal in a predetermined period and outputs the digital signal as the detection data, under the control of the processing unit 20.

In the above-mentioned example, the sensor unit 10 uses the capacitance (mutual capacitance) between the electrodes ($L_x$ and $L_y$) as the capacitive sensor element and detects the approach of the object using a change in the capacitance. However, the present invention is not limited to this example. The approach of the object may be detected by various other methods. For example, a method may be used in which the sensor unit 10 detects the capacitance (self-capacitance) between the electrode and the ground, which is formed by the approach of the object. In the method of detecting the self-capacitance, the driving voltage is applied to the detection electrode.

[Processing Unit 20]

The processing unit 20 is a circuit that controls the overall operation of the input device and includes, for example, a CPU which performs processes according to command codes of a program stored in the storage unit 30 and a logic circuit which implements a specific function. All of the processes of the processing unit 20 may be implemented by the CPU on the basis of the program stored in a non transitory memory or some or all of the processes of the processing unit 20 may be implemented by the logic circuit.

In the example illustrated in FIG. 1, the processing unit 20 includes a sensor control unit 21, a noise amount calculation unit 22, a filter unit 24, a positional data calculation unit 25, and a sampling frequency selection unit 26.

The sensor control unit 21 controls the driving unit 14 such that the driving electrode $L_x$ is appropriately selected and the driving voltage is appropriately generated and controls the detection data generation unit 13 such that charge is appropriately sampled and the detection data is appropriately generated.

When the detection data which is used by the positional data calculation unit 25 to calculate positional data (main scan) is generated, the sensor control unit 21 sequentially selects one driving electrode $L_x$ from the plurality of driving electrodes $L_x$ and controls the driving unit 14 such that the driving voltage is applied to the capacitor 12 formed by the selected one driving electrode $L_x$ and the detection electrode $L_y$.

In this case, the sensor control unit 21 controls the driving unit 14 such that the driving voltage is changed at a constant sampling frequency selected by the sampling frequency selection unit 26. In addition, the sensor control unit 21 controls the detection data generation unit 13 such that the charge which is transmitted in each detection electrode $L_y$ is sampled in synchronization with a change in the driving voltage and the detection data of each detection electrode $L_y$ corresponding to the sampling result is generated.

When a plurality of detection data items which are used by the noise amount calculation unit 22 to calculate one amount of instantaneous noise $N_{DF}$ is generated (noise scanning), the sensor control unit 21 sets the application condition of the driving voltage in the driving unit 14 during the generation of each of the plurality of detection data items such that substantially the same amount of charge is transmitted in the detection electrode $L_y$ when no noise is input to the detection electrode $L_y$. Therefore, it is possible to calculate the amount of noise input to the detection electrode $L_y$ on the basis of the difference between the plurality of detection data items.

Specifically, when a plurality of detection data items which are used by the noise amount calculation unit 22 to calculate one amount of instantaneous noise $N_{DF}$, the sensor control unit 21 controls the driving unit 14 such that a driving voltage that is common to a plurality of capacitors 12 formed by at least some of the plurality of driving electrodes $L_x$ and the detection electrode $L_y$ is applied. In this case, the driving voltage may be changed at the same sampling frequency as that of the detection data generation unit 13 or it may be constantly maintained. Alternatively, the sensor control unit 21 may perform control such that at least some of the plurality of driving electrodes $L_x$ are in a floating state.

The sensor control unit 21 controls the detection data generation unit 13 in parallel to the control of the driving unit 14. That is, the sensor control unit 21 controls the detection data generation unit 13 such that the charge transmitted in each detection electrode $L_y$ is sampled at a constant frequency and the detection data corresponding to the sampling result is generated for each detection electrode $L_y$.

The sensor control unit 21 controls the detection data generation unit 13 such that the operation for generating the detection data of each detection electrode $L_y$ used to calculate the amount of instantaneous noise $N_{DF}$ is performed for each of a plurality of predetermined sampling frequencies a plurality of times. Therefore, the detection data of each detection electrode $L_y$ required to calculate the amount of instantaneous noise $N_{DF}$ is generated for each of the plurality of sampling frequencies.

The sensor control unit 21 controls the driving unit 14 and the detection data generation unit 13 such that the detection data which is used by the positional data calculation unit 25 to calculate the positional data is generated for each period $T_{REPORT}$ and the operation for generating a plurality of detection data items which are used by the noise amount calculation unit 22 to calculate one amount of instantaneous noise $N_{DF}$ is performed for each period $T_{REPORT}$ at least once.

The noise amount calculation unit 22 calculates the amount of noise included in the detection data generated by the sensor unit 10. Specifically, the noise amount calculation unit 22 includes an instantaneous noise amount calculation unit 221 and a noise amount averaging unit 222.

The instantaneous noise amount calculation unit 221 calculates the amount of instantaneous noise $N_{DF}$ corresponding to the difference between the plurality of detection data items which are used by the sensor unit 10 to calculate the amount of noise, on the basis of the plurality of detection data items. For example, when two detection data items are generated, the instantaneous noise amount calculation unit 221 calculates the absolute value of the difference between the two detection data items as the amount of instantaneous noise $N_{DF}$. When three or more detection data items are generated, the instantaneous noise amount calculation unit 221 may calculate, as the amount of instantaneous noise $N_{DF}$, the absolute value of the difference between the maximum value and the minimum value of the plurality of detection data items or statistics (for example, variance or standard deviation) indicating a variation in the plurality of detection data items.

When a plurality of detection data items for calculating the amount of instantaneous noise $N_{DF}$ are generated for each of the plurality of detection electrodes $L_y$ provided in the sensor unit 10, the instantaneous noise amount calculation unit 221 calculates the amount of instantaneous noise $N_{DF}$ corresponding to the difference between the plurality of detection data items for each detection electrode $L_y$. Then, the instantaneous noise amount calculation unit 221 selects, as the calculation result of the amount of instantaneous noise, the largest amount of instantaneous noise ($N_{DF}$MAX) among a plurality of amounts of instantaneous noise $N_{DF}$ calculated for the plurality of detection electrodes $L_y$.

When the detection data of each detection electrode $L_y$ for calculating the amount of noise is generated for each of the plurality of sampling frequencies, the instantaneous noise amount calculation unit 221 calculates the amount of instantaneous noise $N_{DF}$ for each sampling frequency.

The noise amount averaging unit 222 averages the amounts of instantaneous noise ($N_{DF}$MAX) which are repeatedly calculated by the instantaneous noise amount calculation unit 221. For example, the noise amount averaging unit 222 integrates a predetermined number of amounts of instantaneous noise ($N_{DF}$MAX) calculated by the instantaneous noise amount calculation unit 221, averages the amounts of instantaneous noise ($N_{DF}$MAX), and outputs the average value as the average amount of noise $N_V$. A method of averaging the amounts of instantaneous noise $N_{DF}$ is not limited to a simple integration operation, but may be performed by any averaging process. For example, an appropriate averaging process (for example, weighted average) may be further performed on the integration result of a predetermined number of amounts of instantaneous noise $N_{DF}$.

The filter unit 24 attenuates noise included in the detection data for calculating the positional data, which is output from the sensor unit 10, using a low-pass filtering process. Therefore, the number of high-frequency noise components included in the detection data is reduced.

The filter unit 24 changes the noise attenuation characteristics of the low-pass filtering process, depending on the amount of noise $N_V$ calculated by the noise amount calculation unit 22. That is, the filter unit 24 changes the noise attenuation characteristics of the low-pass filtering process such that the attenuation of noise increases as the amount of noise $N_V$ increases and decreases as the amount of noise $N_V$ decreases. Specifically, the filter unit 24 changes the noise attenuation characteristics of the low-pass filtering process such that a cutoff frequency decreases as the amount of noise $N_V$ increases and increases as the amount of noise $N_V$ decreases.

The filter unit 24 performs, for example, the low-pass filtering process represented by the following expression:

[Expression 1]
$$FSD_{NEW} = \frac{(K-1) \times FSD_{OLD} + SD}{K}. \quad (1)$$

In Expression (1), "SD" indicates detection data (target value) to be subjected to the low-pass filtering process, "K" indicates a coefficient, "$FSD_{OLD}$" indicates the previous processing result of the low-pass filtering process, and "$FSD_{NEW}$" indicates the new processing result of the low-pass filtering process. According to Expression (1), the filter unit 24 adds a value obtained by multiplying the detection data SD by a weight coefficient "1/K" and a value obtained by multiplying the previous processing result $FSD_{OLD}$ of the low-pass filtering process by a weight coefficient "(K−1)/K" to calculate the new processing result $FSD_{NEW}$ of the low-pass filtering process.

The filter unit 24 changes the coefficient K in Expression (1), depending on the amount of noise $N_V$ calculated by the noise amount calculation unit 22. That is, the filter unit 24 increases the coefficient K as the amount of noise $N_V$ increases and decreases the coefficient K as the amount of noise $N_V$ decreases. For example, the filter unit 24 changes the coefficient K in proportion to the amount of noise $N_V$ according to an appropriate proportional constant α. In this case, the coefficient K is represented by the following expression:

[Expression 2]
$$K = \alpha N_V \quad (2)$$

According to Expression (1) and Expression (2), as the amount of noise $N_V$ increases, the weight coefficient "(K−1)/K" of the previous processing result $FSD_{OLD}$ increases relative to the weight coefficient "1/K" of the detection data SD. Therefore, the cutoff frequency shifts to the lower side and the attenuation of noise increases. In addition, as the amount of noise $N_V$ decreases, the weight coefficient "(K−1)/K" of the previous processing result $FSD_{OLD}$ decreases relative to the weight coefficient "1/K" of the detection data SD. Therefore, the cutoff frequency shifts to the higher side and the attenuation of noise decreases.

The positional data calculation unit 25 calculates the positional data indicating the approach position of the object, on the basis of the detection data at a plurality of detection positions output from the sensor unit 10. For example, the positional data calculation unit 25 generates two-dimensional data indicating whether the object is approaching at each position on the operation surface, on the basis of the detection result of the sensor unit 10 and stores the two-dimensional data in the storage unit 30. The positional data calculation unit 25 specifies a region of the operation surface, which the object approaches, on the basis of the two-dimensional data, and calculates the coordinates indicating the position of the region (for example, the coordinates of the center of gravity of the region) as the positional data.

The sampling frequency selection unit 26 selects a sampling frequency with the smallest amount of noise on the basis of the amount of noise $N_V$, which is calculated by the noise amount calculation unit 22 for each of a plurality of predetermined sampling frequencies. When the sampling frequency selection unit 26 selects the sampling frequency with low noise, the filter unit 24 changes the noise attenuation characteristics of the low-pass filtering process, depending on the amount of noise $N_V$ calculated for the selected sampling frequency. When the detection data which is used by the positional data calculation unit 25 to, calculate the positional data is generated (main scanning), the sensor control unit 21 controls the driving unit 14 such that the driving voltage is changed at the selected sampling frequency.

[Storage Unit]

The storage unit 30 stores constant data or variable data which is used for the process of the processing unit 20. When the processing unit 20 includes a CPU, the storage unit 30 may store programs which are executed by the CPU. The storage unit 30 includes, for example, a volatile memory, such as a DRAM or an SRAM, and a non-volatile memory, such as a flash memory.

[Interface Unit]

The interface unit 40 is a circuit for exchanging data between the input device and another control device (for example, a control IC of an information apparatus provided with the input device). The processing unit 20 outputs information (for example, the positional data of an object and the number of objects) stored in the storage unit 30 from the interface unit 40 to a control device (not illustrated).

Next, the operation of the input device having the above-mentioned structure will be described with reference to FIGS. 2A to 6.

Figures 2A, 2B:
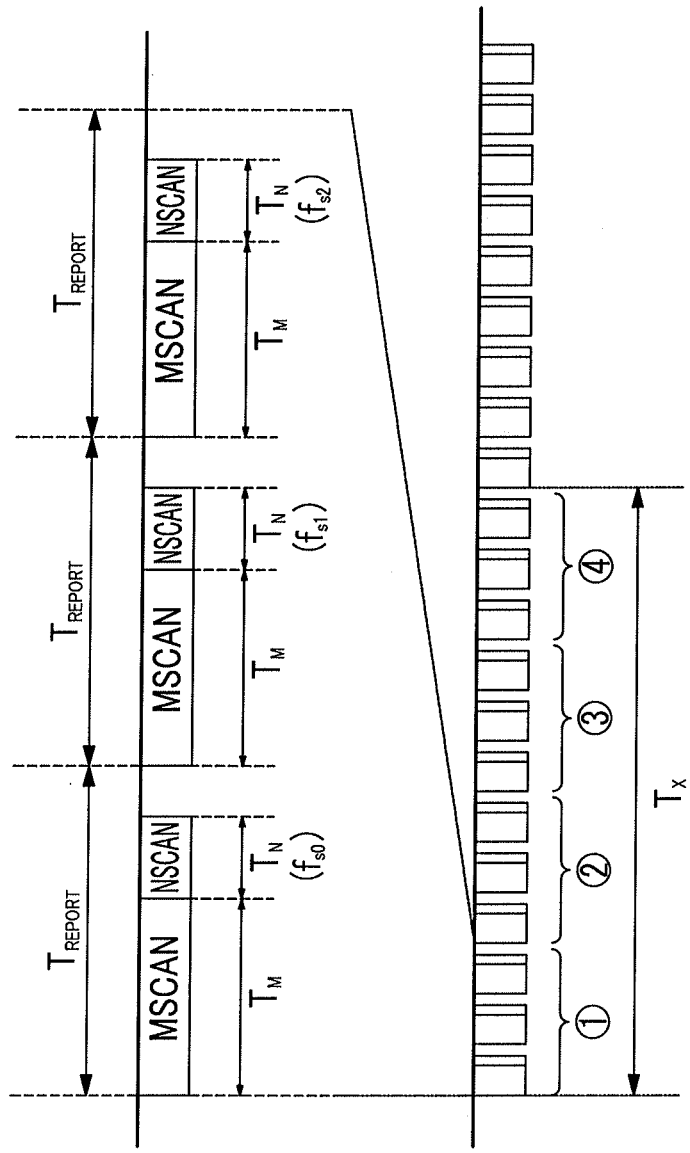
FIGS. 2A and 2B are timing charts illustrating an example of the operation of the input device according to the first embodiment.

FIGS. 2A and 2B are timing charts illustrating an example of the operation of the input device according to this embodiment. FIG. 2A is a timing chart illustrating the details of a period $T_{REPORT}$ in which the positional data is calculated and FIG. 2B is a timing chart illustrating a period $T_x$ in which the amount of noise $N_V$ of each sampling frequency is set.

In FIGS. 2A and 2B, "MSCAN" indicates a "main scanning" period for which the sensor matrix 11 is scanned in order to generate detection data for calculating positional data. In addition, "NSCAN" indicates a "noise scanning" period for which the sensor matrix 11 is scanned in order to generate detection data for calculating the amount of noise.

The period $T_{REPORT}$ is a period in which a change in the capacitance due to the approach of the object (for example, a finger) or the calculation result of the positional data is reported from the interface unit 40 to the host device and is particularly set to a sufficiently short time to accurately check the movement locus of the finger.

As illustrated in FIG. 2A, the sensor control unit 21 controls the sensor unit 10 such that the main scanning is performed in each period $T_{REPORT}$. A main scanning period $T_M$ is shorter than the period $T_{REPORT}$.

The sensor control unit 21 controls the sensor unit 10 such that noise scanning for generating the detection data for calculating the amount of noise is performed once in each period $T_{REPORT}$. A noise scanning period $T_N$ is shorter than the main scanning period $T_N$.

The sensor control unit 21 sequentially selects the sampling frequency used in each period $T_{REPORT}$ of the noise scanning from a plurality of sampling frequencies. For example, in FIG. 2A, the sensor control unit 21 circularly selects three sampling frequencies in order of "$f_{s0}$", "$f_{s1}$", and "$f_{s2}$". Therefore, the sensor control unit 21 performs the noise scanning of all sampling frequencies for a period "$3 \times T_{REPORT}$".

The sensor control unit 21 performs the noise scanning of all sampling frequencies a plurality of times (four times in the example illustrated in FIG. 2B). The noise amount averaging unit 222 calculates the averaged amount of noise $N_V$ at each sampling frequency, on the basis of a plurality of amounts of instantaneous noise ($N_{DF}$MAX) which are calculated for each sampling frequency by the instantaneous noise amount calculation unit 221 using a plurality of noise scanning operations. In the example illustrated in FIG. 2B, since four noise scanning operations are performed for each of three sampling frequencies ($f_{s0}$, $f_{s1}$, and $f_{s2}$), the period $T_x$ in which the amount of noise $N_V$ of all sampling frequencies is "$12 \times T_{REPORT}$".

The sampling frequency selection unit 26 selects the sampling frequency at which the smallest amount of noise is included in the detection data, on the basis of the amount of noise $N_V$ of all sampling frequencies calculated for each period $T_x$. The sensor control unit 21 performs the main scanning at the sampling frequency with low noise and the filter unit 24 changes the noise attenuation characteristics, depending on the amount of noise $N_V$ calculated for the sampling frequency with low noise.

Figure 3:
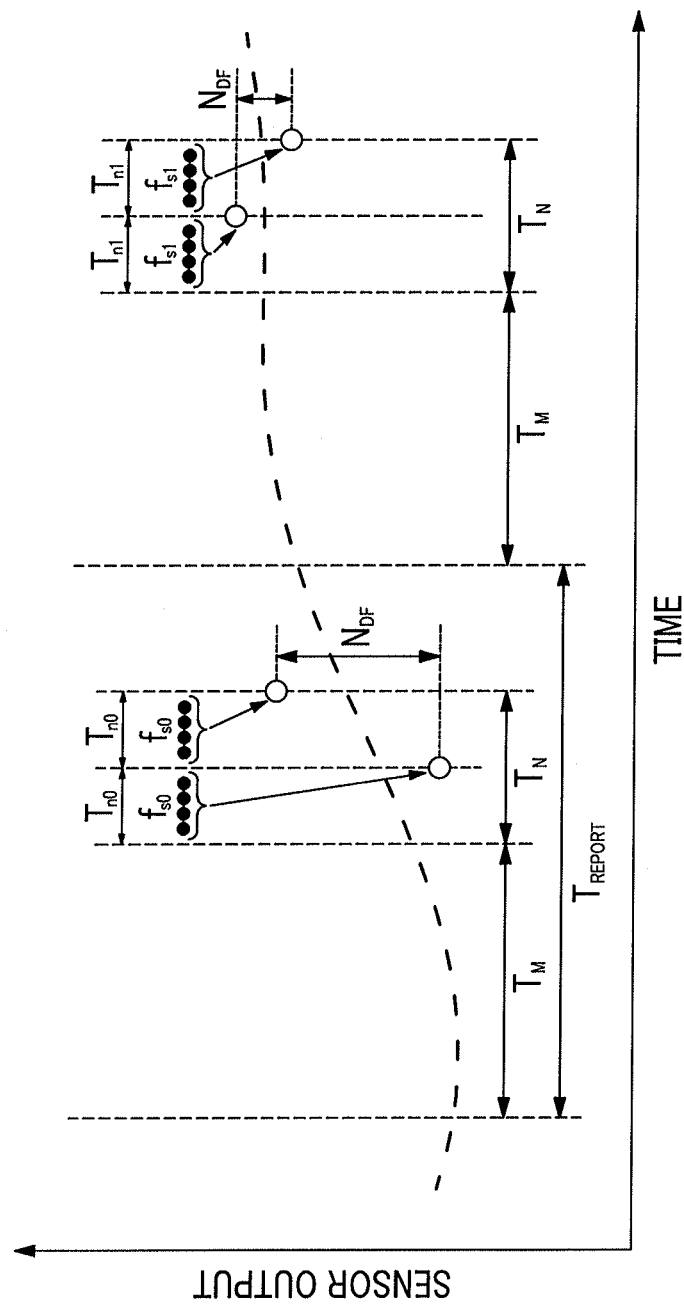
FIG. 3 is a diagram illustrating an operation for generating detection data for calculating the amount of noise in noise scanning.

FIG. 3 is a diagram illustrating an operation for generating the detection data for calculating the amount of noise in the noise scanning.

A waveform represented by a dotted line in FIG. 3 indicates a temperature variation or a slow change in the detection data due to the approach of the finger. In the actual detection data, a noise component, which is relatively rapidly changed is superimposed on a component which is slowly changed, such as the waveform represented by the dotted line.

The sensor control unit 21 controls the sensor unit 10 such that a plurality of detection data items (two detection data items in the example illustrated in FIG. 3) are generated for each detection electrode $L_y$ in the noise scanning period $T_N$. The noise scanning period $T_N$ is sufficiently shorter than the period $T_{REPORT}$. A change in the detection data due to the movement of the finger in the scanning period $T_N$ is very small. The instantaneous noise amount calculation unit 221 calculates the amount of instantaneous noise $N_{DF}$ of the detection data, on the basis of the difference between the plurality of detection data items which are generated in the same scanning period $T_N$.

Figures 4A, 4B:
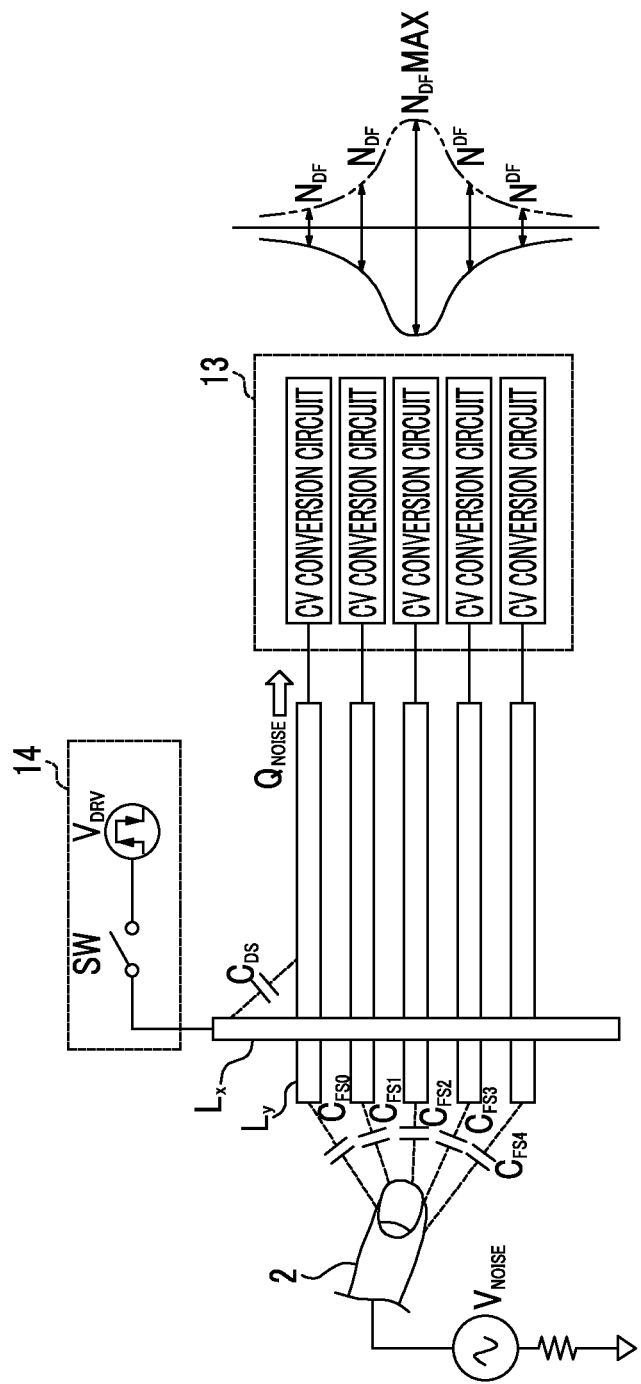
FIGS. 4A and 4B are diagrams illustrating an example of a state in which noise is input to a detection electrode through a finger.

FIGS. 4A and 4B are diagrams illustrating an example of the state in which noise is input to the detection electrode $L_y$ through the finger. FIG. 4A illustrates the state in which noise is input to each detection electrode $L_y$ by the capacitance coupling between the detection electrode $L_y$ and the finger. FIG. 4B illustrates the amount of instantaneous noise $N_{DF}$ calculated for each detection electrode $L_y$.

As illustrated in FIG. 4A, the most direct mixture path of noise to the detection electrode $L_y$ is a path through the finger (human body). In FIG. 4A, "$C_{SF0}$" to "$C_{SF4}$" indicates the capacitance coupling between each detection electrode $L_y$ and the finger. A charge $Q_{NOISE}$ corresponding to a noise voltage $V_{NOISE}$ of a noise source is mainly transmitted in the detection electrode $L_y$ through the capacitance coupling and becomes a noise component of the detection data.

In the measurement of the amount of instantaneous noise $N_{DF}$, it is preferable to detect the difference (noise difference caused by noise) between a plurality of detection data items for the scanning period $T_N$ which is sufficiently shorter than the period for which the finger moves and it is not necessary to detect the charge (charge which changes depending on the approach of the finger) stored in a mutual capacitor $C_{DS}$ between the driving electrode $L_x$ and the detection electrode $L_y$. Therefore, any voltage may be applied from the driving unit 14 to each driving electrode $L_x$ during the noise scanning.

For example, as illustrated in FIG. 4A, the sensor control unit 21 may separate all of the driving electrodes $L_x$ from a voltage source $V_{DRV}$ of the driving unit 14 so as to float or it may maintain the voltage of all of the driving electrodes $L_x$ at a constant value. Alternatively, the sensor control unit 21 may change the voltage of all of the driving electrodes $L_x$ at the same frequency as the sampling frequency of the detection data generation unit 13. In addition, the sensor control unit 21 does not need to set all of the driving electrodes $L_x$ in the same state and may set, for example, some of the driving electrodes $L_x$ to a floating state or a constant voltage while periodically changing the voltage of other driving electrodes $L_x$.

However, when a plurality of detection data items (in the example illustrated in FIG. 3, two detection data items in the scanning period $T_N$) for calculating the amount of noise are generated in order to calculate the amount of instantaneous noise $N_{DF}$ on the basis of the difference between the plurality of detection data items, the sensor control unit 21 needs to set the application condition of the driving voltage during the generation of each detection data item such that substantially the same amount of charge is transmitted in the detection electrode $L_y$ when no noise is input to the detection electrode $L_y$.

As the simplest structure, when a plurality of detection data items for calculating the amount of noise are generated, the application conditions of the driving voltage in the driving unit 14 may be the same. For example, in FIG. 3, the generation of the detection data may be continuously performed two times while the same application condition of the driving voltage in the driving unit 14 is maintained (for example, while all of the driving electrodes $L_x$ are maintained in the floating state or at a constant voltage).

Alternatively, when the condition that is substantially the same as when no noise is included in the charge transmitted in the detection electrode $L_y$ is satisfied, the application conditions of the driving voltage in the driving unit 14 during the generation of the plurality of detection data items for calculating the amount of noise may be different from each other.

When the finger approaches a plurality of detection electrodes $L_y$ provided in the sensor matrix 11 of the sensor unit 10 as illustrated in FIG. 4A, the amount of instantaneous noise $N_{DF}$ calculated for each detection electrode $L_y$ varies depending on the distance between the finger and the detection electrode $L_y$, as illustrated in FIG. 4B. In general, the detection electrode $L_y$ closer to the finger has a larger amount of instantaneous noise $N_{DF}$. The instantaneous noise amount calculation unit 221 compares the amounts of instantaneous noise $N_{DF}$ calculated for a plurality of detection electrodes $L_y$ and selects the largest amount of instantaneous noise $N_{DF}$MAX as the calculation result of the amount of noise. The instantaneous noise amount calculation unit 221 selects the largest amount of instantaneous noise $N_{DF}$MAX of each detection electrode $L_y$ whenever the noise scanning is performed.

Figure 5A:
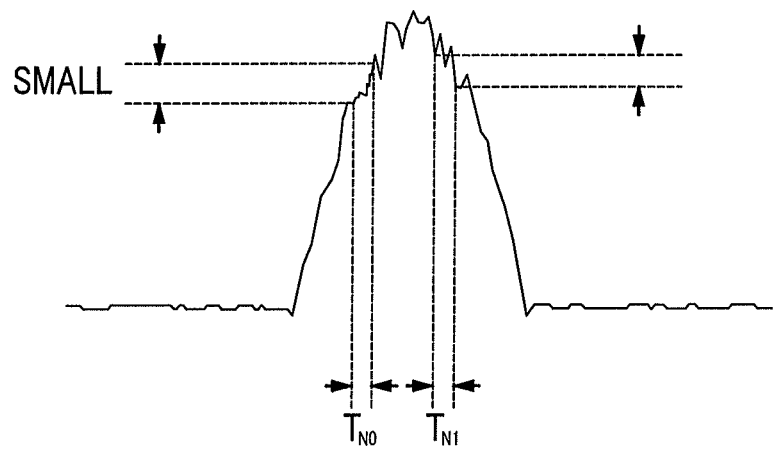
FIGS. 5A and 5B are graphs illustrating the waveform of charge which is transmitted in the detection electrode when the finger temporarily approaches the detection electrode.
Figure 5B:
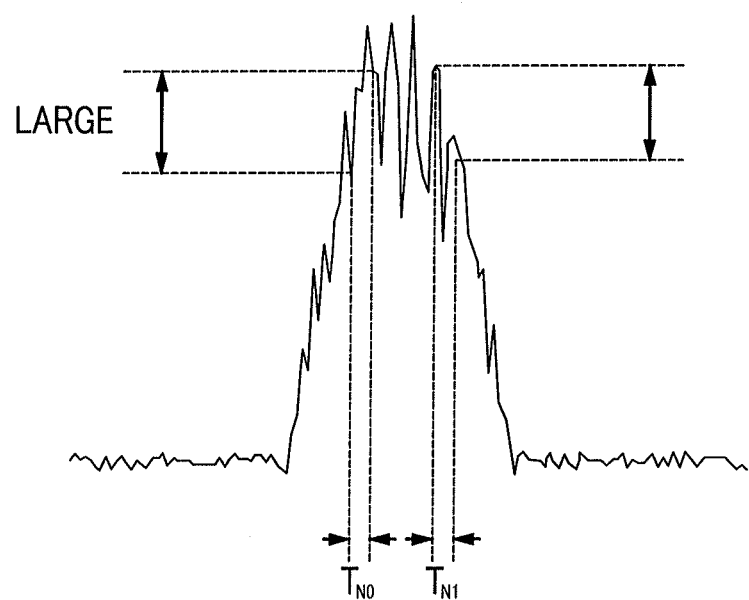

FIGS. 5A and 5B are graphs illustrating the waveform of the charge which is transmitted in the detection electrode $L_y$ when the finger temporarily approaches the detection electrode $L_y$. FIG. 5A illustrates a case in which the amount of noise is relatively small and FIG. 5B illustrates a case in which the amount of noise is relatively large.

As illustrated in FIGS. 5A and 5B, as the amplitude of noise input to the detection electrode $L_y$ increases, the amplitude of noise in the waveform of the charge transmitted in the detection electrode $L_y$ increases. When the amplitude of noise in the waveform of the charge increases, a change in the charge in the scanning period $T_N$ increases. Therefore, the difference between the detection data items generated according to the sampling result of charge increases and the amount of instantaneous noise $N_{DF}$ increases.

Figure 6:
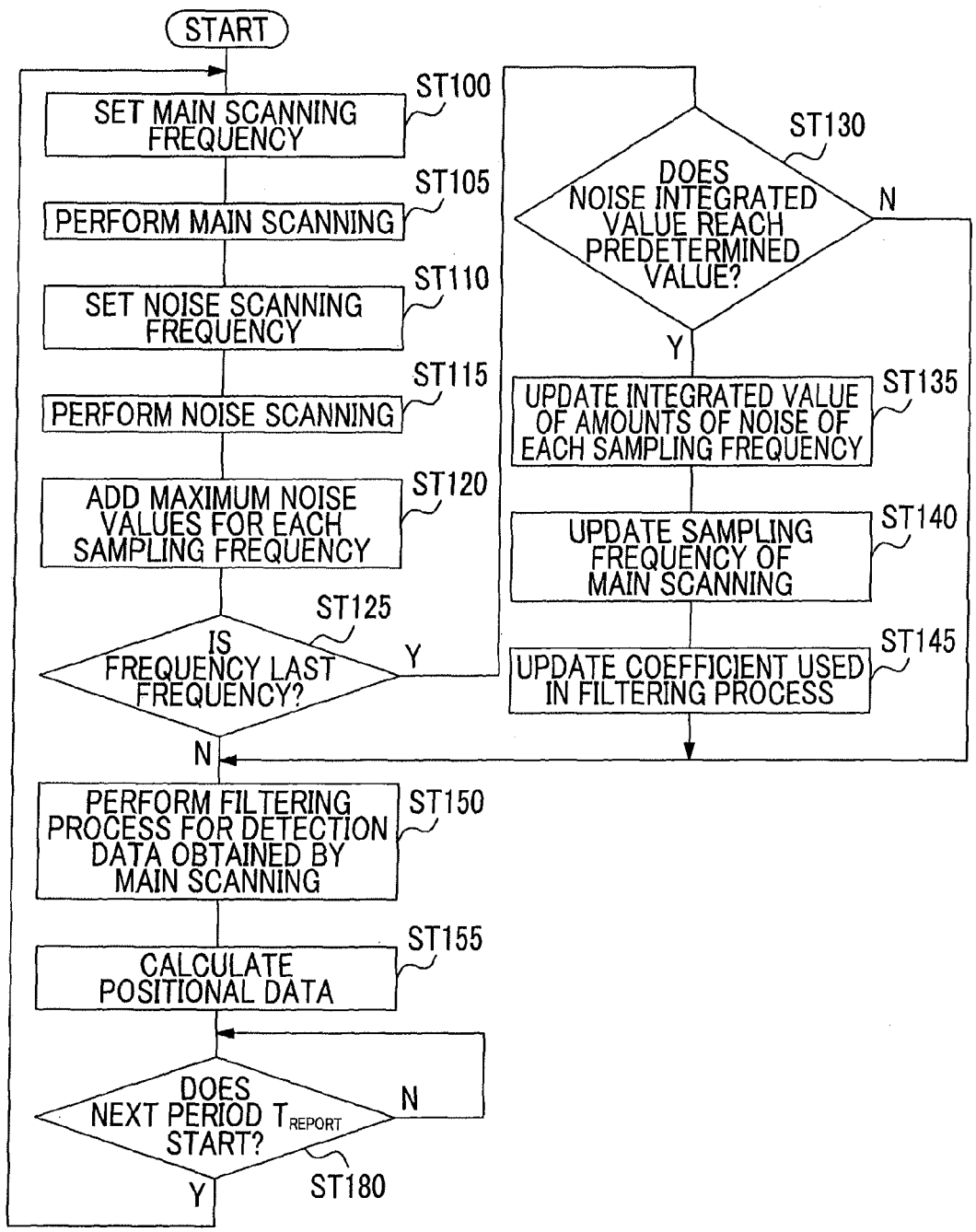
FIG. 6 is a flowchart illustrating the operation of the input device according to the first embodiment.

FIG. 6 is a flowchart illustrating the operation of the input device according to the first embodiment. The flowchart illustrated in FIG. 6 indicates an operation which is repeated for each period $T_{REPORT}$.

First, at the beginning of the period $T_{REPORT}$, the sensor control unit 21 sets the frequency, which has been selected by the sampling frequency selection unit 26 in the previous period $T_{REPORT}$, as the sampling frequency of the main scanning (ST100) and performs the main scanning (ST105). The sensor control unit 21 controls the driving unit 14 such that one driving electrode $L_x$ is sequentially selected from a plurality of driving electrodes $L_x$ and periodically changes the potential of the selected one driving electrode $L_x$ at the frequency set in Step ST100. When the potential of the driving electrode $L_x$ is changed, the driving voltage applied to the capacitor 12 which is formed in the vicinity of the intersection point of the driving electrode $L_x$ and the detection electrode $L_y$ is changed and the capacitor 12 is charged or discharged. When charge is transmitted in each detection electrode $L_y$ with the charging or discharge of the capacitor 12, the sensor control unit 21 controls the detection data generation unit 13 such that the charge in each detection electrode $L_y$ is sampled at the set frequency and the detection data corresponding to the sampling result is generated for each detection electrode $L_y$. When the above-mentioned voltage driving is performed for all of the driving electrodes $L_x$, the detection data corresponding to the capacitance of the capacitor 12 at each detection position on the operation surface of the sensor matrix 11 is generated. The detection data is stored in the form of two-dimensional data in the storage unit 30.

When the main scanning is completed, the sensor control unit 21 selects one sampling frequency from a plurality of predetermined sampling frequencies and sets the selected sampling frequency as the sampling frequency of the noise scanning (ST110). The circular order of a plurality of sampling frequencies is predetermined ($f_{s0}$, $f_{s1}$, $f_{s2}$, $f_{s0}$, $f_{s1}$, $f_{s2}$, ... in the example illustrated in FIG. 2) and the sampling frequency in the current period $T_{REPORT}$ is determined from the sampling frequency in the previous period $T_{REPORT}$.

The sensor control unit 21 performs the noise scanning at the sampling frequency set in Step ST110 (ST115). For example, the sensor control unit 21 controls the driving unit 14 such that all of the driving electrodes $L_x$ are in the floating state or at a constant potential. Then, the sensor control unit 21 controls the detection data generation unit 13 such that the charge of each detection electrode $L_y$ is sampled at the set frequency and the detection data corresponding to the sampling result is generated for each detection electrode $L_y$. The sensor control unit 21 controls the detection data generation unit 13 such that the generation of the detection data of each detection electrode $L_y$ is performed a plurality of times, while maintaining the same application condition of the driving voltage to the driving electrode $L_x$ by the driving unit 14.

When a plurality of detection data items for each detection electrode $L_y$ are obtained, the instantaneous noise amount calculation unit 221 calculates the amount of instantaneous noise $N_{DF}$ corresponding to the difference between the plurality of detection data items for each detection electrode $L_y$. Then, the instantaneous noise amount calculation unit 221 compares the calculated amounts of instantaneous noise $N_{DF}$ and selects the largest amount of instantaneous noise $N_{DF}$MAX as the calculation result of the amount of instantaneous noise.

The noise amount averaging unit 222 adds the amount of instantaneous noise ($N_{DF}$MAX) calculated by the instantaneous noise amount calculation unit 221 to the integrated value of the amount of noise which is stored for each sampling frequency in the storage unit 30 (ST120). That is, the noise amount averaging unit 222 reads the integrated value of the amount of noise corresponding to the sampling frequency set in Step ST110 from the storage unit 30, adds the amount of instantaneous noise ($N_{DF}$MAX) calculated by the instantaneous noise amount calculation unit 221 to the integrated value of the amount of noise, and writes the addition result back to the storage unit 30.

When the last frequency ($f_{s2}$ in the example illustrated in FIG. 2) in a predetermined order is set as the sampling frequency for noise scanning (ST125) and the number of integrations of the amount of instantaneous noise ($N_{DF}$MAX) in Step ST120 reaches a predetermined value (4 in the example illustrated in FIG. 2) (ST130), the noise amount averaging unit 222 decides the average amount of noise $N_V$ of each sampling frequency. The noise amount averaging unit 222 updates the amount of noise $N_V$ of each of the previous sampling frequencies stored in the storage unit 30 to the decided latest amount of noise $N_V$ (ST135).

In this case, the noise amount averaging unit 222 may use the integrated value of the amount of noise in Step ST120 as the latest amount of noise $N_V$. Alternatively, the noise amount averaging unit 222 may perform an additional averaging process, such as a process of calculating the weighted average of the previous amount of noise $N_V$ and the integrated value of the amount of noise in Step ST120, and may use the processing result as the latest amount of noise $N_V$.

When the noise amount averaging unit 222 updates the amount of noise $N_V$, the sampling frequency selection unit 26 compares a plurality of amounts of noise $N_V$ calculated for a plurality of sampling frequencies and selects the sampling frequency with the smallest amount of noise $N_V$ as the sampling frequency for main scanning. The sampling frequency selection unit 26 updates the current sampling frequency for main scanning, which is stored in the storage unit 30, to the sampling frequency, which is newly selected in Step ST140 (ST140). In Step ST100 for the next period $T_{REPORT}$, the sampling frequency for main scanning is set on the basis of the information of the sampling frequency stored in the storage unit 30.

When the sampling frequency selection unit 26 selects a new sampling frequency for main scanning, the filter unit 24 newly sets a coefficient related to the attenuation characteristics of a low-pass filtering process, on the basis of the amount of noise $N_V$ which is calculated for the selected sampling frequency by the noise amount calculation unit 22 (ST145). For example, the filter unit 24 newly sets the coefficient K of the low-pass filtering process in Expression (1) on the basis of the amount of noise $N_V$, using the following relationship in Expression (2): "$K=\alpha \cdot N_V$".

The filter unit 24 performs, for example, the low-pass filtering process represented by Expression (1) for the detection data for calculating positional data, which is obtained by the main scanning in Step ST105, to attenuate the noise included in the detection data (ST150). In this case, when the coefficient K is updated by the process in Steps ST125 to ST145, the filter unit 24 performs the low-pass filtering process using the updated coefficient K. When the coefficient K is not updated, the filter unit 24 performs the low-pass filtering process using the same coefficient K as that in the previous period $T_{REPORT}$.

When the filter unit 24 performs the low-pass filtering process for the detection data, the positional data calculation unit 25 calculates positional data indicating the approach position of the object, on the basis of the filtered detection data (ST155). That is, the positional data calculation unit 25 converts two-dimensional data, which is the filtered detection data, into two-dimensional data, which is binary data indicating whether the object is approaching, and calculates the positional data indicating the position of a region on the operation surface, which the object approaches, on the basis of the converted two-dimensional data.

When the process in Steps ST100 to ST155 ends and a new period $T_{REPORT}$ starts, the processing unit 20 returns to Step ST100 (ST180) and repeats the above-mentioned process.

Next, the relationship between the noise reduction effect of the low-pass filtering process and a response delay in the input device according to this embodiment will be described with reference to FIGS. 7 to 10.

Figure 7:
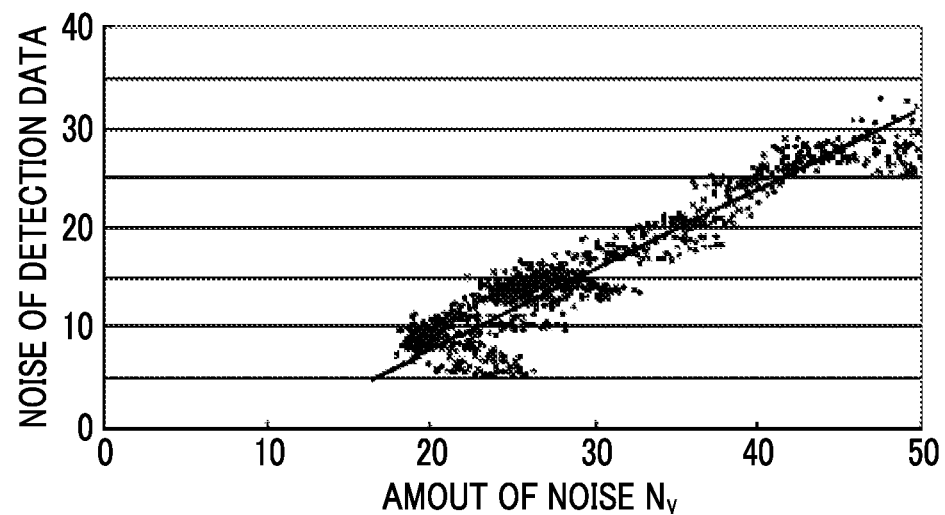
FIG. 7 is a diagram illustrating the relationship between noise included in the detection data and the amount of noise calculated by a noise amount calculation unit.

FIG. 7 is a diagram illustrating the relationship between the amount of noise $N_V$ calculated by the noise amount calculation unit 22 and the noise of the detection data. The noise of the detection data indicates a variation in the detection data (a value that is three times more than a standard deviation σ). As illustrated in FIG. 7, the amount of noise $N_V$ calculated by the noise amount calculation unit 22 is substantially proportional to the noise of the detection data.

Figure 8:
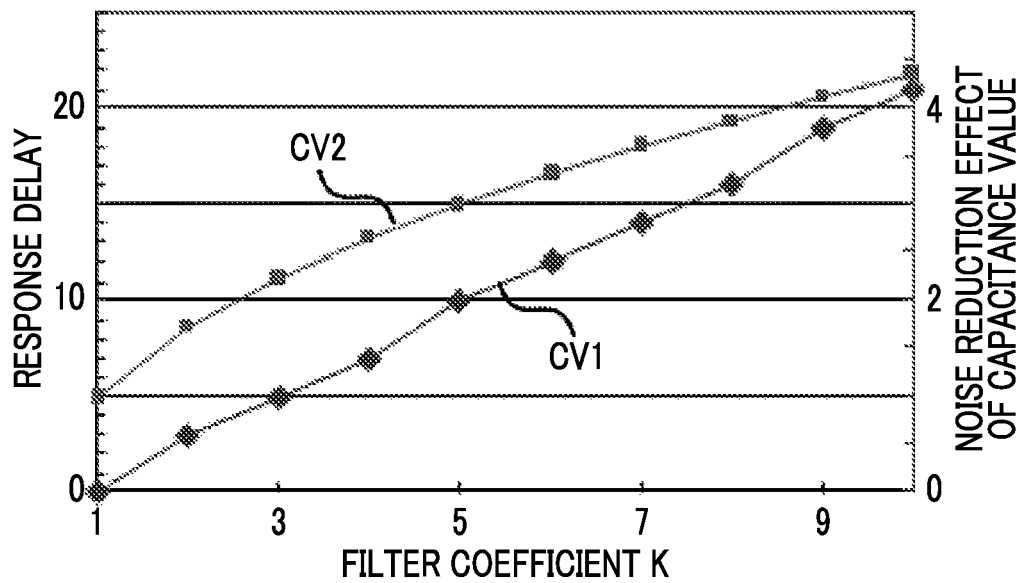
FIG. 8 is a diagram illustrating the relationship among a coefficient of a low-pass filtering process, a response delay, and a noise reduction effect.

FIG. 8 is a diagram illustrating the relationship among the coefficient K of the low-pass filtering process represented by Expression (1), the response delay, and the noise reduction effect. In FIG. 8, a curve CV1 indicates the response delay (the period for which the filtered detection data reaches 90% of a prescribed value) and a curve CV2 indicates the reduction effect of the noise (standard deviation σ) of the detection data. As illustrated in FIG. 8, in the low-pass filtering process represented by Expression (1), as the coefficient K increases, the noise reduction effect is improved. However, in this case, the response delay also increases.

Figure 9:
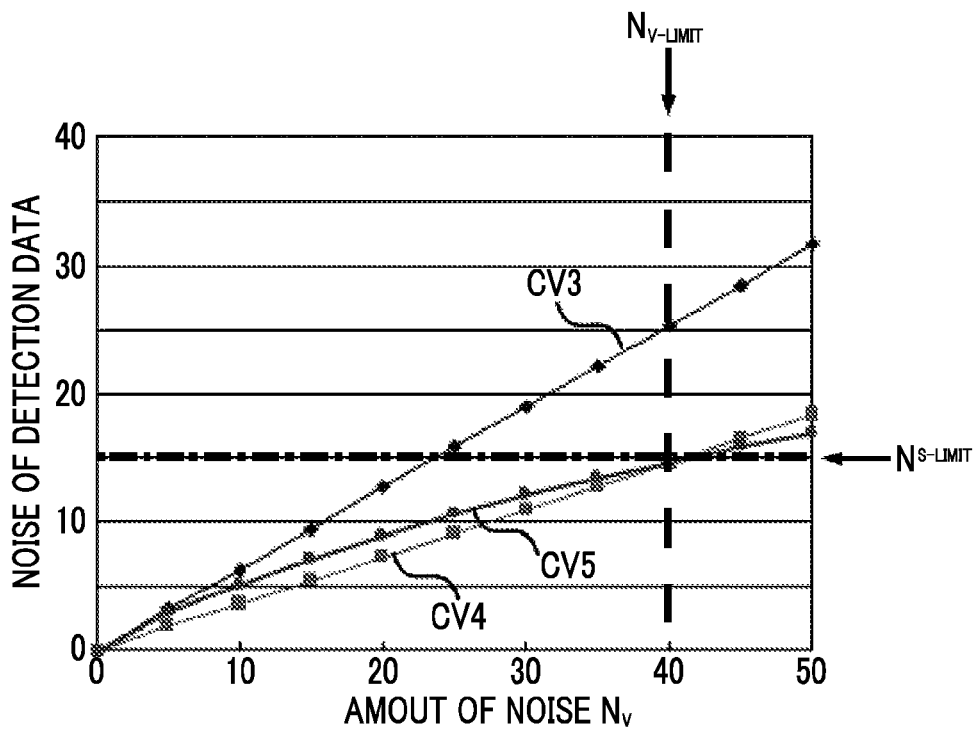
FIG. 9 is a diagram illustrating the relationship between noise included in the detection data and the amount of noise calculated by the noise amount calculation unit and illustrates the comparison among a case in which the low-pass filtering process is not performed, a case in which the low-pass filtering process is performed with a fixed coefficient, and a case in which the coefficient of the low-pass filtering process is changed depending on the amount of noise.

FIG. 9 is a diagram illustrating the relationship between noise included in the detection data and the amount of noise calculated by the noise amount calculation unit 22. FIG. 9 illustrates the comparison among a case in which the low-pass filtering process is not performed, a case in which the low-pass filtering process is performed with a fixed coefficient K, and a case in which the coefficient K of the low-pass filtering process is changed depending on the amount of noise $N_V$. A curve CV3 indicates the case in which the low-pass filtering process is not performed, a curve CV4 indicates the case in which the coefficient K is fixed to "2", and a curve CV5 indicates the case in which the coefficient K is changed depending on the amount of noise $N_V$.

For example, the coefficient K of the low-pass filtering process is determined so as to satisfy each of a "noise allowable limit value $N_{V\text{-}LIMIT}$ of the device", a "function limit value $N_{S\text{-}LIMIT}$ of the device", and a "response delay limit $D_{LIMIT}$". The noise allowable limit value $N_{V\text{-}LIMIT}$ of the device indicates the upper limit of noise applied to the device. The function limit value $N_{S\text{-}LIMIT}$ of the device indicates the upper limit of noise (variation) in the detection data at which a functional failure does not occur due to an error in the calculation of the positional data (coordinate fluctuation or jump). The response delay limit $D_{LIMIT}$ indicates the upper limit of an allowable response delay.

In the example illustrated in FIG. 9, in the case in which the low-pass filtering process is not performed, when noise corresponding to the noise allowable limit value $N_{V\text{-}LIMIT}$ of the device is applied as represented by the curve CV3, the amount of noise in the detection data is greater than the function limit value $N_{S\text{-}LIMIT}$. The low-pass filtering process is required in order to satisfy these conditions.

In the case in which the coefficient K is set to "2" and the low-pass filtering process is performed for the detection data, when noise corresponding to the function limit value $N_{S\text{-}LIMIT}$ of the device is applied, the amount of noise in the detection data is slightly less than the function limit value $N_{S\text{-}LIMIT}$ of the device.

Therefore, when the coefficient K is set to "2" and the low-pass filtering process is performed, it is possible to satisfy both the noise allowable limit value $N_{V\text{-}LIMIT}$ of the device and the function limit value $N_{S\text{-}LIMIT}$ of the device, as represented by the curve CV4.

However, when the amount of noise applied to the device is less than the noise allowable limit value $N_{V\text{-}LIMIT}$, the amount of noise in the detection data is reduced in proportion to the reduction in the amount of noise applied. When the amount of noise $N_V$ is less than the noise allowable limit value $N_{V\text{-}LIMIT}$, it is possible to prevent the amount of noise in the detection data from exceeding the function limit value $N_{S\text{-}LIMIT}$ of the device even though the coefficient K is less than "2".

Therefore, in the input device according to this embodiment, for example, the coefficient K is reduced with a reduction in the amount of noise $N_V$ such that the relationship represented by Expression (2) is satisfied. Even when the coefficient K is changed in this way, it is possible to satisfy both the noise allowable limit value $N_{V\text{-}LIMIT}$ of the device and the function limit value $N_{S\text{-}LIMIT}$ of the device, as represented by the curve CV5 in FIG. 9. In addition, the coefficient K can be reduced to decrease the response delay, as illustrated in the following drawing.

Figure 10:
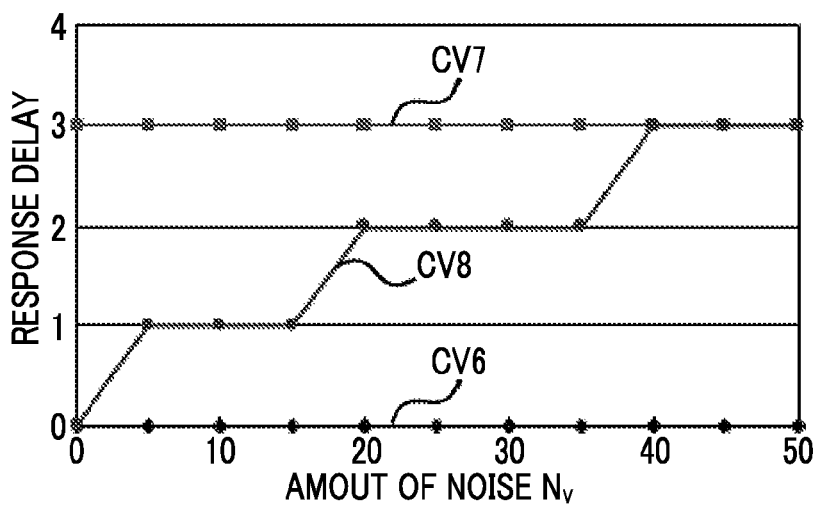
FIG. 10 is a diagram illustrating the relationship between a response delay and the amount of noise calculated by the noise amount calculation unit 22 and illustrates the comparison among the case in which the low-pass filtering process is not performed, the case in which the low-pass filtering process is performed with a fixed coefficient, and the case in which the coefficient of the low-pass filtering process is changed depending on the amount of noise.

FIG. 10 is a diagram illustrating the relationship between a response delay and the amount of noise $N_V$ calculated by the noise amount calculation unit 22 and illustrates the comparison among a case in which the low-pass filtering process is not performed, a case in which the low-pass filtering process is performed with a fixed coefficient K, and a case in which the coefficient K of the low-pass filtering process is changed depending on the amount of noise $N_V$. A curve CV6 indicates the case in which the low-pass filtering process is not performed, a curve CV7 indicates the case in which the coefficient K is fixed to "2", and a curve CV8 indicates the case in which the coefficient K is changed depending on the amount of noise $N_V$.

As illustrated in FIG. 10, in the case in which the coefficient K of the low-pass filtering process is changed depending on the amount of noise $N_V$ (CV8), particularly, when the amount of noise is small, the response delay is significantly reduced, as compared to the case in which the low-pass filtering process is performed with the fixed coefficient K (CV7).

As described above, according to the input device of this embodiment, the sensor unit 10 outputs the detection data as the detection result of the approach state of the object at a plurality of detection positions and the noise amount calculation unit 22 calculates the amount of noise in the detection data as the amount of noise $N_V$. Then, when the filter unit 24 attenuates the noise in the detection data, the noise attenuation characteristics of the low-pass filtering process are changed depending on the calculated amount of noise $N_V$ such that the attenuation of the noise increases as the amount of noise $N_V$ increases and the attenuation of the noise decreases as the amount of noise $N_V$ decreases.

Therefore, the noise attenuation characteristics are changed such that a large amount of noise is attenuated by the low-pass filtering process in a high noise environment, which makes it possible to reduce the influence of noise. The noise attenuation characteristics are changed such that a small amount of noise is attenuated by the low-pass filtering process in a low noise environment, which makes it possible to reduce the response delay.

In addition, it is possible to increase the attenuation of noise in a high noise environment while ensuring a response in a low noise environment. Therefore, it is possible to reduce the influence of noise, without adding an electric component for EMC countermeasure, such as a resistor or an inductor (ferrite bead), to the sensor input unit and thus to simplify the structure of the device.

Second Embodiment

Next, a second embodiment of the present invention will be described.

In the input device according to the first embodiment, only one sampling frequency is used for the noise scanning which is performed in one period $T_{REPORT}$. However, in an input device according to this embodiment, the noise scanning is performed for all sampling frequencies in one period $T_{REPORT}$. The input device according to this embodiment has the same structure as the input device illustrated in FIG. 1 except for the operation of a processing unit 20, which will be described below.

Figures 11A, 11B:
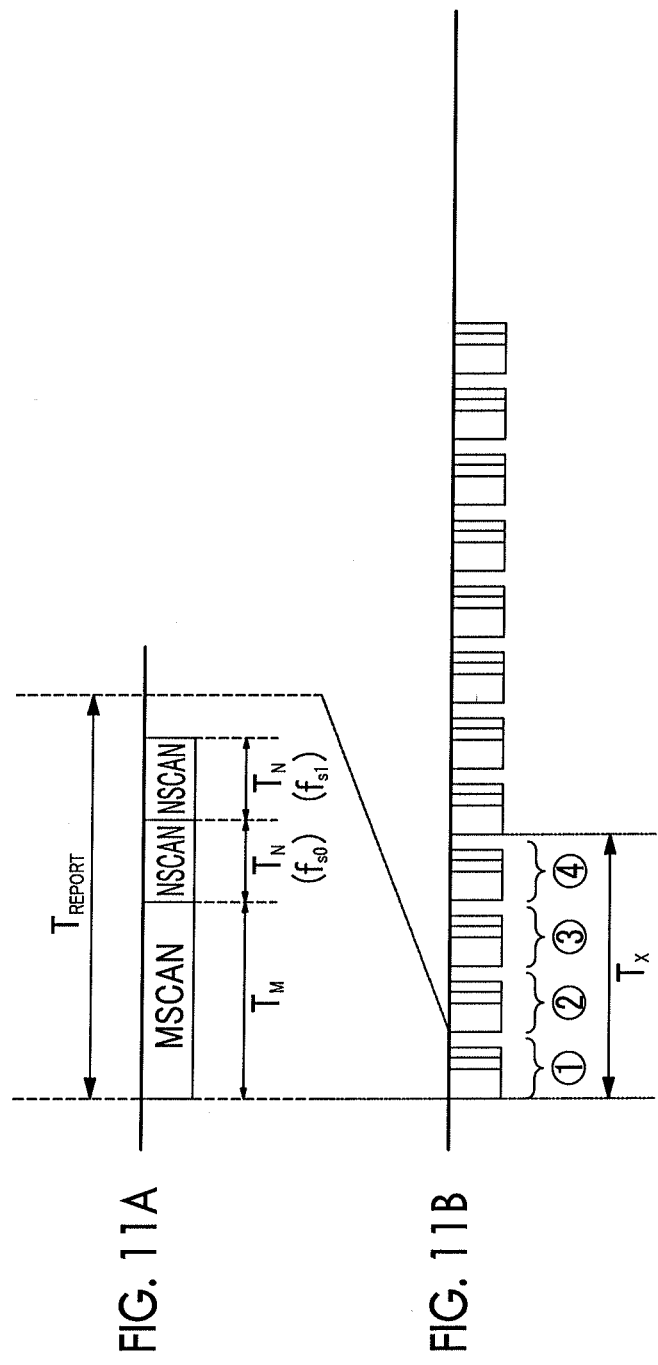
FIGS. 11A and 11B are timing charts illustrating an example of the operation of an input device according to a second embodiment.

FIGS. 11A and 11B are timing charts illustrating an example of the operation of the input device according to the second embodiment. FIG. 11A is a timing chart illustrating the details of a period $T_{REPORT}$ in which positional data is calculated and FIG. 11B is a timing chart illustrating a period $T_x$ in which the amount of noise of each sampling frequency is set. In the example illustrated in FIG. 11, there are two sampling frequencies ($f_{s0}$ and $f_{s1}$) and noise scanning is performed for all of the sampling frequencies in one period $T_{REPORT}$. In four periods $T_{REPORT}$, when the noise scanning is performed for each of the sampling frequencies ($f_{s0}$ and $f_{s1}$) four times, the averaged amount of noise $N_V$ is calculated for each sampling frequency on the basis of the integrated value of four amounts of instantaneous noise ($N_{DF}$MAX).

Figure 12:
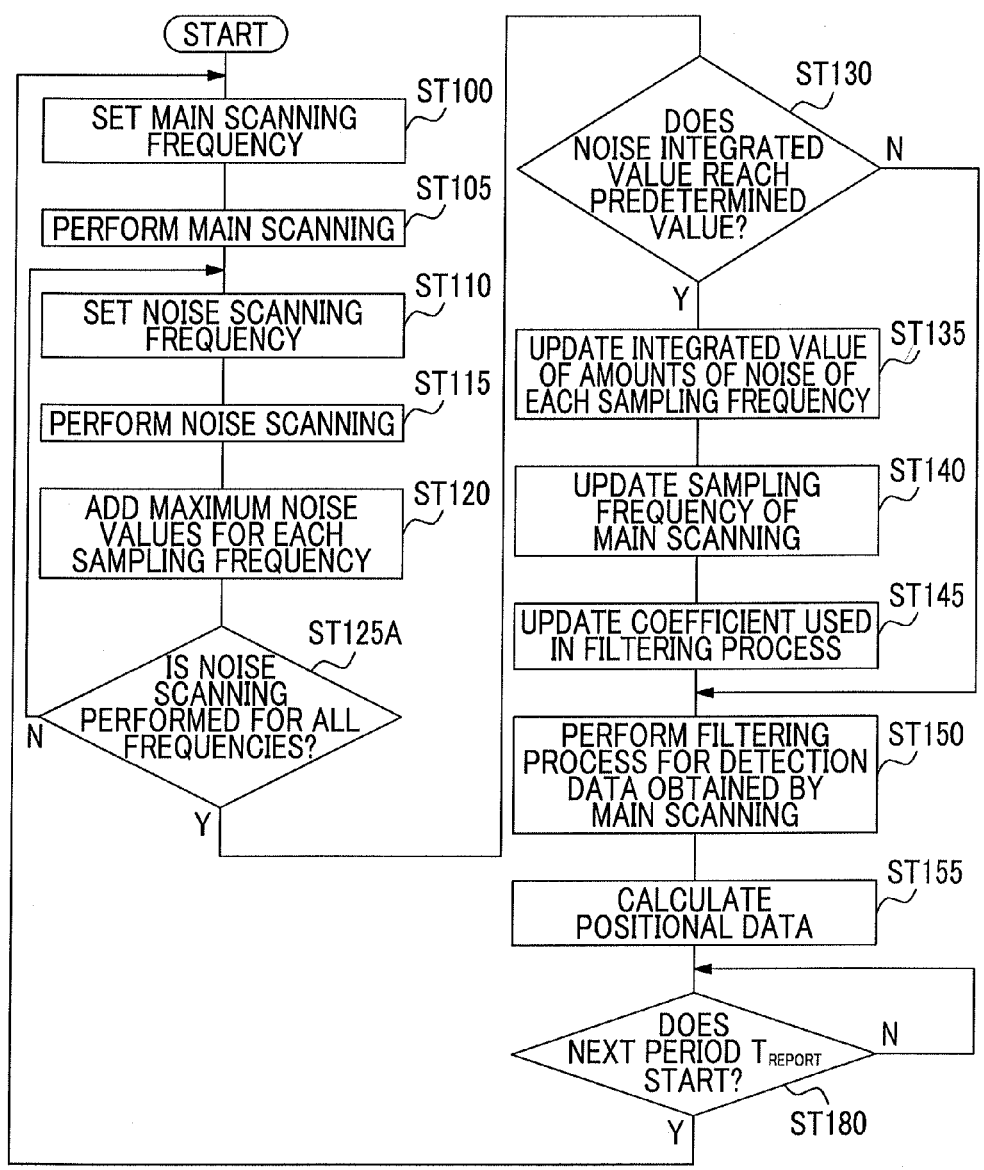
FIG. 12 is a flowchart illustrating the operation of the input device according to the second embodiment.

FIG. 12 is a flowchart illustrating the operation of the input device according to the second embodiment and illustrates the operation, which is repeated for each period $T_{REPORT}$, similarly to FIG. 6.

In FIG. 12, the process from Step ST100 to Step ST120 is the same as that in the flowchart illustrated in FIG. 6. In the flowchart illustrated in FIG. 12, after main scanning is performed (ST105), noise scanning is performed for all sampling frequencies in the same period $T_{REPORT}$ (ST110 to ST125A). Then, when the number of integrations of the amount of instantaneous noise ($N_{DF}$MAX) reaches a predetermined value (4 in the example illustrated in FIG. 11), the sampling frequency and a low-pass filter coefficient K are updated in Steps ST135 to ST145 which are the same as those in FIG. 6. Then, a low-pass filtering process is performed for detection data (ST150) and positional data is calculated (ST155). When the number of integrations of the amount of instantaneous noise ($N_{DF}$MAX) does not reach the predetermined value, the process from Step ST135 to ST145 is not performed and the low-pass filtering process for the detection data (ST150) and the calculation of the positional data (ST155) are performed.

As described above, since the noise scanning is performed for all sampling frequencies in one period $T_{REPORT}$, it is possible to increase the frequency of update of the amount of noise $N_V$ and the sampling frequency. Therefore, even in an environment in which noise changes suddenly, the filter unit 24 can set appropriate noise attenuation characteristics and it is possible acquire detection data with low noise at an appropriate sampling frequency.

Third Embodiment

Next, a third embodiment of the present invention will be described.

In the input devices according to the above-described embodiments, the low-pass filtering process is performed for the detection data input to the positional data calculation unit 25. However, in an input device according to this embodiment, the low-pass filtering process is performed for the positional data calculated by the positional data calculation unit 25.

Figure 13:
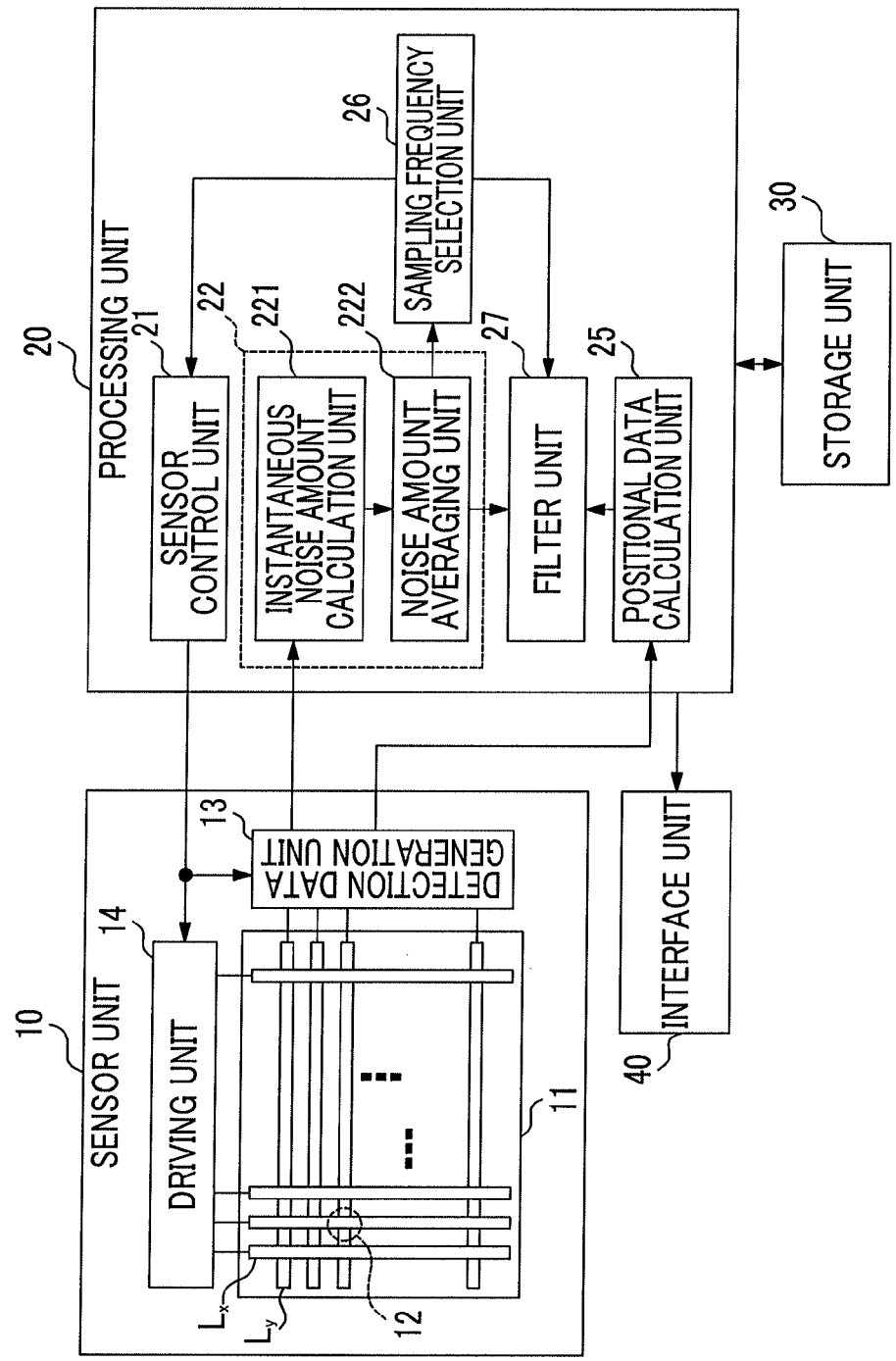
FIG. 13 is a diagram illustrating an example of the structure of an input device according to a third embodiment.

FIG. 13 is a diagram illustrating an example of the structure of the input device according to the third embodiment. The input device illustrated in FIG. 13 has the same structure as the input device illustrated in FIG. 1 except that the filter unit 24 which performs the low-pass filtering process for the detection data in the input device illustrated in FIG. 1 is omitted and a filter unit 27 which performs the low-pass filtering process for the positional data is provided instead of the filter unit 24.

The filter unit 27 performs the low-pass filtering process to attenuate noise included in the positional data calculated by the positional data calculation unit 25. In addition, the filter unit 27 changes the noise attenuation characteristics of the low-pass filtering process, depending on the amount of noise $N_V$ calculated by a noise amount calculation unit 22. That is, the filter unit 27 changes the noise attenuation characteristics of the low-pass filtering process such that the attenuation of noise increases as the amount of noise $N_V$ increases and the attenuation of noise decreases as the amount of noise $N_V$ decreases.

The filter unit 27 performs the low-pass filtering process represented by, for example, the following expression:

[Expression 3]

$$FPD_{NEW} = \frac{(L-1) \times FPD_{OLD} + PD}{L}. \qquad (3)$$

In Expression (3), "PD" indicates positional data (target value) to be subjected to the low-pass filtering process, "L" indicates a coefficient, "$FPD_{OLD}$" indicates the previous processing result of the low-pass filtering process, and "$FPD_{NEW}$" indicates the new processing result of the low-pass filtering process. According to Expression (3), the filter unit 27 adds a value obtained by multiplying the positional data PD by a weight coefficient "1/L" and a value obtained by multiplying the previous processing result $FPD_{OLD}$ of the low-pass filtering process by a weight coefficient "(L−1)/L" to calculate the new processing result $FPD_{NEW}$ of the low-pass filtering process.

The filter unit 27 changes the coefficient L in Expression (3), depending on the amount of noise $N_V$ calculated by the noise amount calculation unit 22. That is, the filter unit 27 increases the coefficient L as the amount of noise $N_V$ increases and decreases the coefficient L as the amount of noise $N_V$ decreases. For example, the filter unit 27 changes the coefficient L in proportion to the amount of noise $N_V$ according to an appropriate proportional constant α. In this case, the coefficient L is represented by the following expression:

[Expression 4]

$$K = \beta N_V \qquad (4)$$

Figure 14:
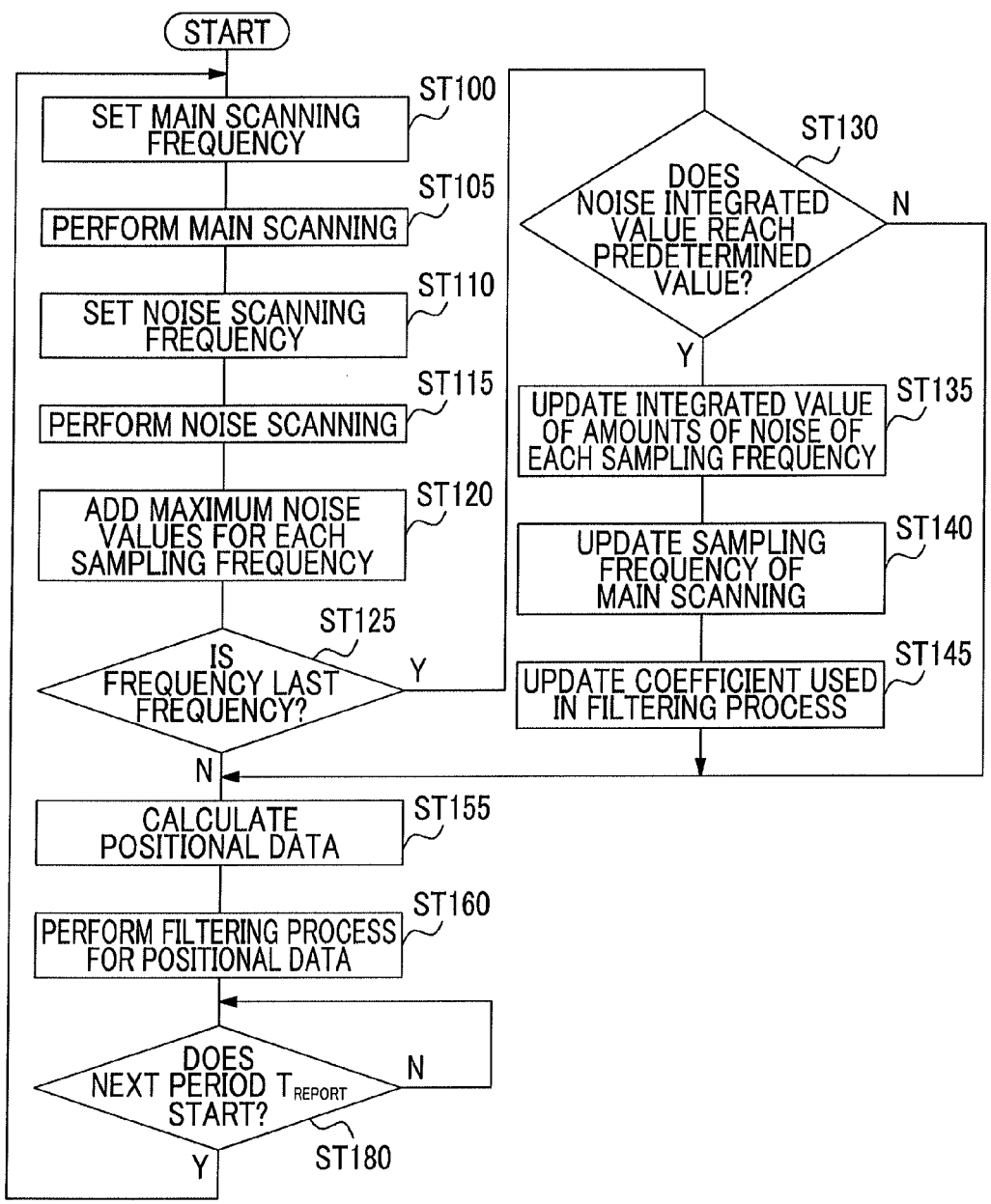
FIG. 14 is a flowchart illustrating the operation of the input device according to the third embodiment.

FIG. 14 is a flowchart illustrating the operation of the input device according to third embodiment and illustrates the operation, which is repeated for each period $T_{REPORT}$. The flowchart illustrated in FIG. 14 is the same as the flowchart illustrated in FIG. 6 except that the detection data filtering process (ST150) in the flowchart illustrated in FIG. 6 is omitted and a positional data filtering process by the filter unit 27 (ST160) is provided instead of the detection data filtering process (ST150).

As described above, even when the low-pass filtering process is performed for the positional data, it is possible to effectively reduce the influence of external noise. In addition, since the noise attenuation characteristics of the low-pass filtering process are changed depending on the amount of noise $N_V$, it is possible to reduce a response delay when the amount of noise is small, similarly to the first and second embodiments.

Fourth Embodiment

Next, a fourth embodiment of the present invention will be described.

In the input devices according to the above-described embodiments, the main scanning is performed by a low-noise sampling frequency selected from a plurality of sampling frequencies. However, in an input device according to this embodiment, the main scanning is performed by a single sampling frequency.

Figure 15:
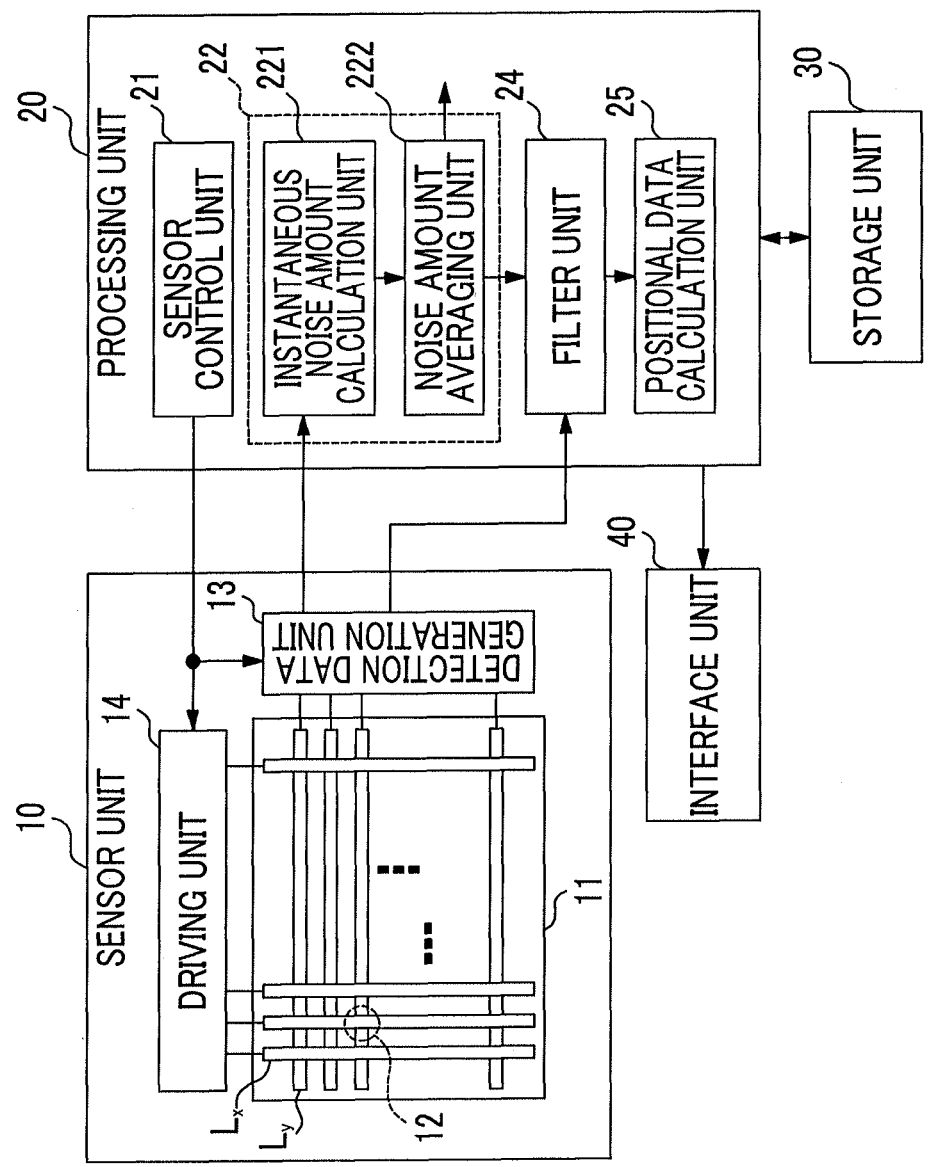
FIG. 15 is a diagram illustrating an example of the structure of an input device according to a fourth embodiment.

FIG. 15 is a diagram illustrating an example of the structure of the input device according to the fourth embodiment. The input device illustrated in FIG. 15 has the same structure as the input device illustrated in FIG. 1 except that the sampling frequency selection unit 26 in the input device illustrated in FIG. 1 is omitted.

Figure 16:
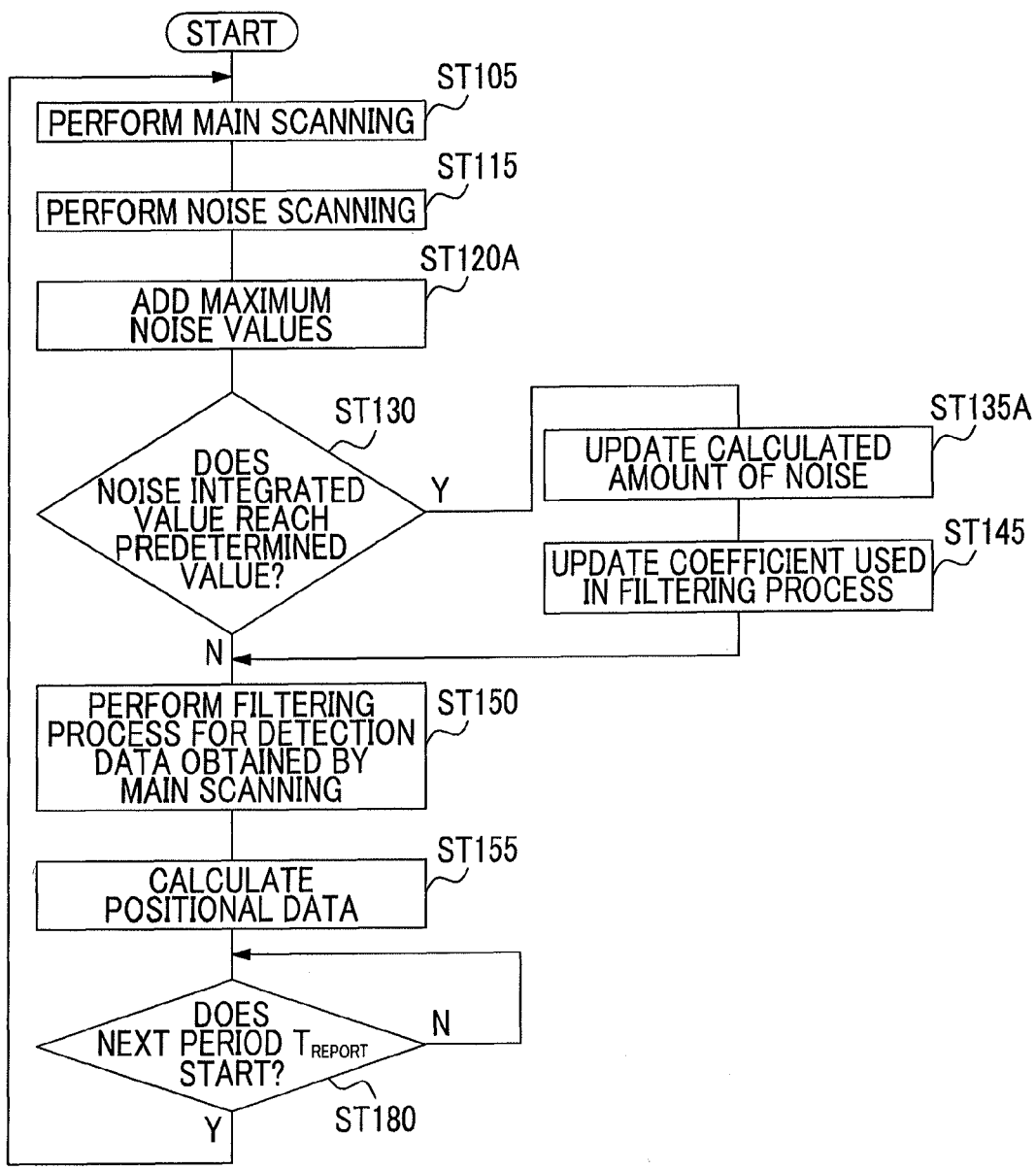
FIG. 16 is a flowchart illustrating the operation of the input device illustrated in FIG. 15.

FIG. 16 is a flowchart illustrating the operation of the input device illustrated in FIG. 15. The flowchart illustrated in FIG. 16 differs from the flowchart illustrated in FIG. 6 in that the process (ST100, ST110, ST125, and ST140) related to the selection of the sampling frequency is omitted. In addition, since a single sampling frequency is used, the amount of instantaneous noise $N_{DF}$ for a single sampling frequency is added in Step ST120A and the amount of noise $N_V$ for a single sampling frequency is updated in Step ST135A. The other processes are the same as those in the flowchart illustrated in FIG. 6.

In the input device illustrated in FIG. 15, the low-pass filtering process is performed for the detection data. However, in the input device illustrated in FIG. 17, which will be described below, the low-pass filtering process is performed for positional data.

Figure 17:
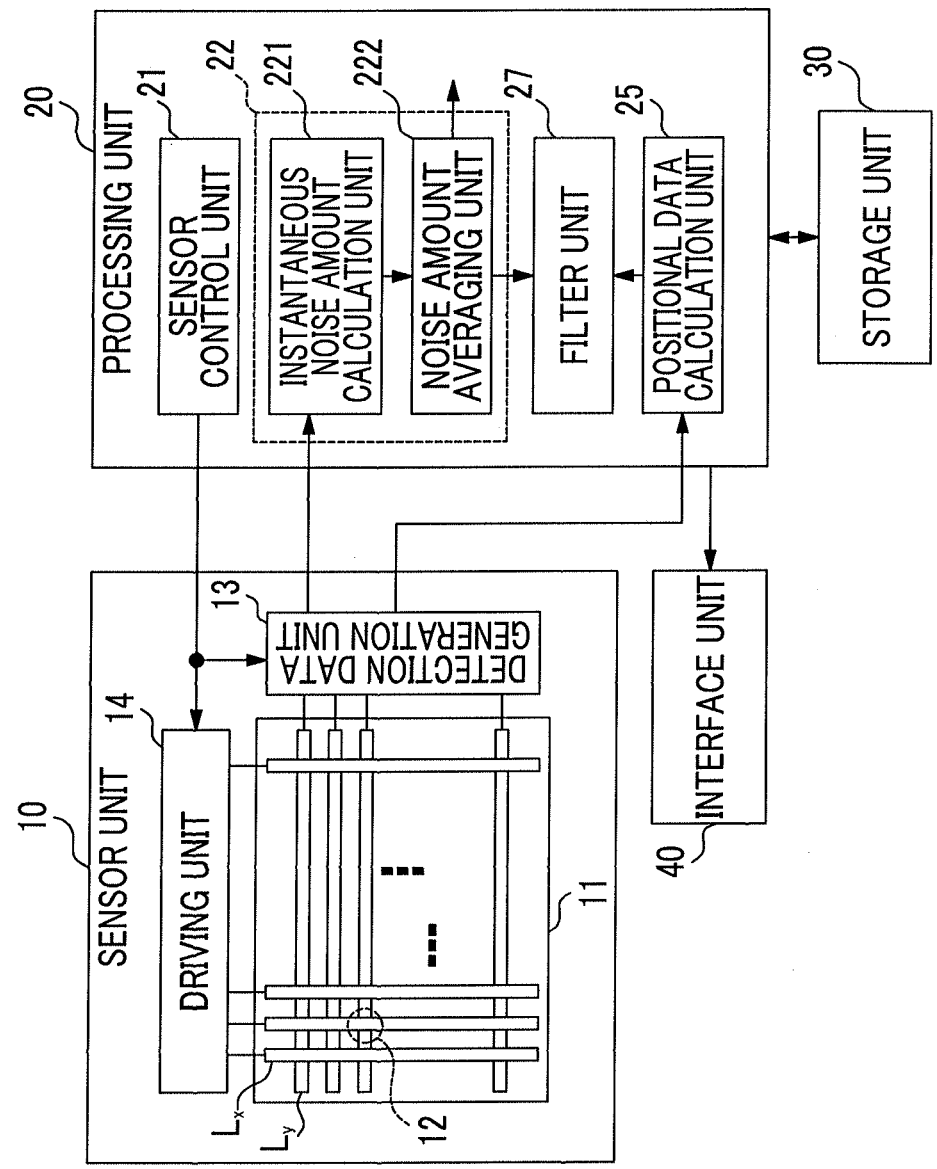
FIG. 17 is a diagram illustrating another example of the structure of the input device according to the fourth embodiment.

FIG. 17 is a diagram illustrating another example of the structure of the input device according to the fourth embodiment. The input device illustrated in FIG. 17 has the same structure as the input device illustrated in FIG. 13 except that the sampling frequency selection unit 26 in the input device illustrated in FIG. 13 is omitted.

Figure 18:
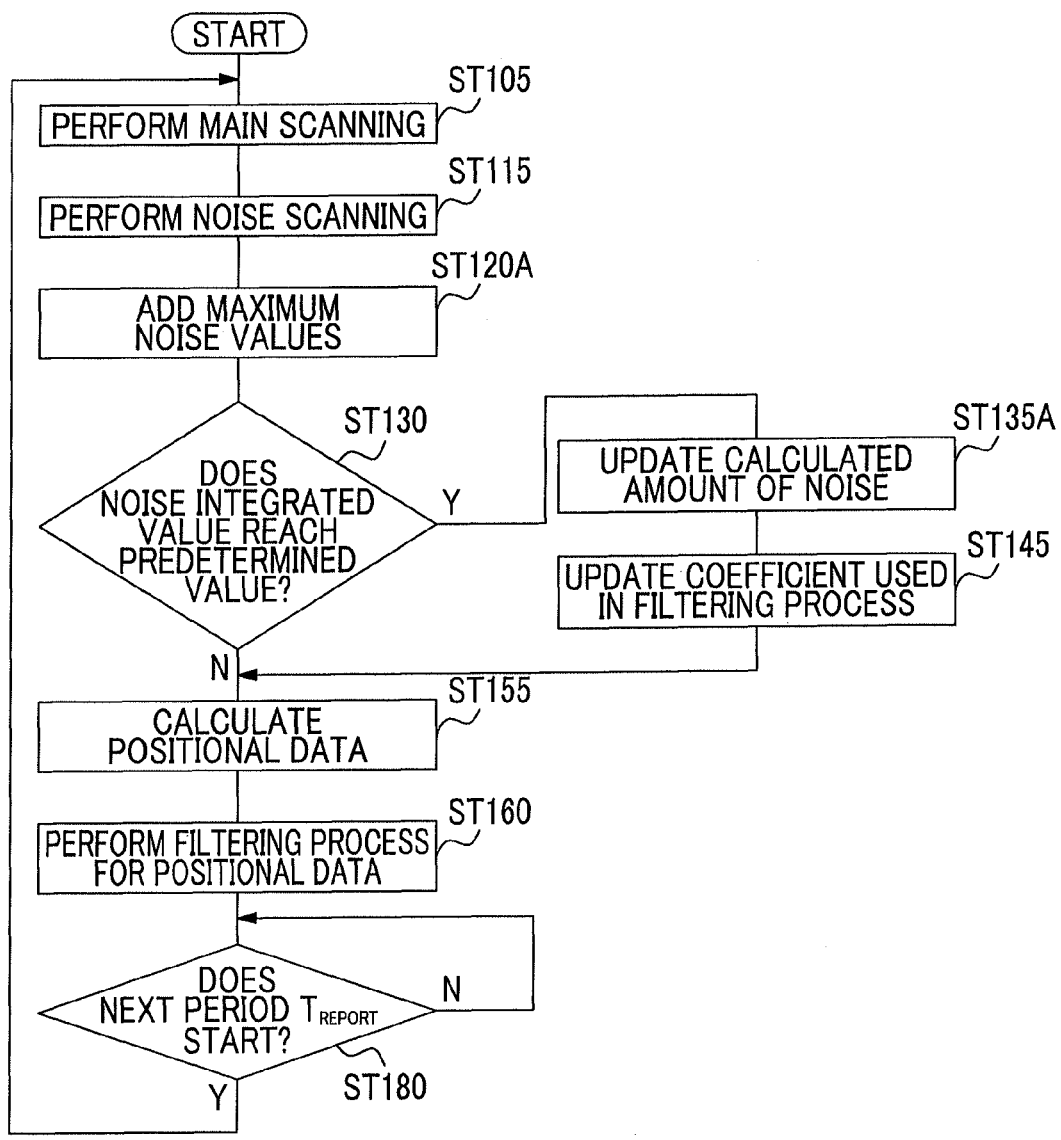
FIG. 18 is a flowchart illustrating the operation of the input device illustrated in FIG. 17.

FIG. 18 is a flowchart illustrating the operation of the input device illustrated in FIG. 17. The flowchart illustrated in FIG. 18 differs from the flowchart illustrated in FIG. 14 in that the process (ST100, ST110, ST125, and ST140) related to the selection of the sampling frequency is omitted. In addition, since a single sampling frequency is used, the amount of instantaneous noise $N_{DF}$ for a single sampling frequency is added in Step ST120A and the amount of noise $N_V$ for a single sampling frequency is updated in Step ST135A. The other processes are the same as those in the flowchart illustrated in FIG. 14.

As described above, even when the main scanning is performed with a single sampling frequency, it is possible to effectively reduce the influence of external noise. In particular, when it is possible to sufficiently reduce noise, without switching the sampling frequencies, the use of a single sampling frequency makes it possible to increase the frequency of update of the amount of noise $N_V$. Therefore, the filter unit 24 can set appropriate noise attenuation characteristics even in an environment in which noise changes suddenly.

Some embodiments of the present invention have been described above. However, the present invention is not limited to the above-described embodiments and includes various variations.

In the above-described embodiments, the example in which the low-pass filtering process is performed for the detection data and the example in which the low-pass filtering process is performed for the positional data are given. However, the present invention is not limited thereto. In another embodiment of the present invention, the low-pass filtering process may be performed for both the detection data and the positional data.

In the above-described embodiments, the noise scanning which acquires the detection data for calculating the amount of noise is performed independently of the main scanning. However, the present invention is not limited thereto. In another embodiment of the present invention, the noise scanning may be omitted and the amount of noise may be calculated using only the detection data obtained by the main scanning.

For example, in an input device having the same structure as that illustrated in FIG. 1, a sensor control unit 21 controls a driving unit 14 and a detection data generation unit 13 such that detection data used to calculate positional data is generated in a fixed period. A noise amount calculation unit 22 calculates the amount of noise corresponding to the difference between a series of detection data items, which are used to calculate the positional data and are generated in a constant period.

Even when the noise scanning is omitted, it is possible to select a low-noise sampling frequency for the main scanning from a plurality of sampling frequencies, similarly to the above-described embodiments. For example, the sensor control unit 21 performs the main scanning for each of the sampling frequencies for each period $T_{REPORT}$ at least once and the noise amount calculation unit 22 calculates the amount of noise for each of the sampling frequencies. The sampling frequency selection unit 26 specifies a sampling frequency with the smallest amount of noise from all sampling frequencies. The positional data calculation unit 25 calculates the positional data on the basis of the detection data of the main scanning, which is performed at the specified low-noise sampling frequency.

When the noise scanning is omitted, the time required to calculate the amount of noise is longer than that when the noise scanning is independently performed since the main scanning time is longer than the noise scanning time. However, when the number of sampling operations is reduced in order to shorten the main scanning time, the number of noise components included in the detection data increases relative to the number of signal components (the S/N ratio is reduced). In this case, the positional data calculation unit 25 may integrate the detection data items corresponding to a predetermined number of cycles, which are generated in a constant period, and may calculate the positional data on the basis of the integrated detection data. That is, the positional data calculation unit 25 calculates the positional data on the basis of the integrated value of the detection data obtained by a plurality of main scanning operations, instead of reducing the number of sampling operations for the main scanning to be less than usual and shortening the scanning time. Therefore, even when the number of sampling operations for the main scanning is reduced to shorten the time required to calculate the amount of noise, it is possible to suppress a reduction in the S/N ratio due to a reduction in the number of sampling operations.

In the above-described embodiments, the attenuation characteristics of the low-pass filtering process are changed depending on the amount of noise. However, the present invention is not limited thereto. In another embodiment of the present invention, the low-pass filtering process may be performed when the amount of noise is large and the low-pass filtering process may be stopped when the amount of noise is small. In this case, it is possible to reduce the influence of noise in a high noise environment and to reduce a response delay in a low noise environment.

In the above-described embodiments, the noise of the detection data is attenuated by the low-pass filtering process noise such that the influence of noise is reduced. However, the present invention is not limited thereto. In another embodiment of the present invention, a function (for example, a function for detecting a tap operation), which is effective when the amount of noise is at a general level, may be stopped when the amount of noise is large. In this case, even when strong noise is input, it is possible to reliably prevent an operation error in a specific function.

In still another embodiment of the present invention, when the amount of noise is large, a predetermined operation error prevention function may be performed. For example, there is the following function: when a very large amount of noise equal to or greater than a predetermined value is detected, a circuit or a measurement parameter is initialized only once immediately after the amount of noise is reduced. When unexpected noise having very high periodicity or continuity is received, an operation error is likely to occur, erroneous setting is likely to be performed, or an unexpected value is likely to be input to the filter unit. In this case, when any operation error occurs, the initialization of the circuit or the measurement parameter is triggered by the situation in which the amount of noise is reduced and the device returns to the original state. Therefore, the possibility of the device automatically returning to the normal operation is very high.

In addition, the following control operation may be performed: when the amount of noise is large, the function of a so-called jitter filter which suppresses the wobble of a pointer such that the pointer is not moved until a variation in positional data is equal to or greater than a predetermined value is activated; and when the amount of noise is small, the function is inactivated.

It should be understood by those skilled in the art that various modifications, combinations, sub-combinations and alterations may occur depending on design requirements and other factors insofar as they are within the scope of the appended claims of the equivalents thereof.

What is claimed is:

1. An input device comprising:
   a sensor unit configured to detect an approach state of an object at a plurality of detection positions and to output the detection result as detection data;
   a positional data calculation unit configured to calculate positional data indicating an approach position of the object on the basis of the detection data at the plurality of detection positions;
   a filter unit configured to perform at least one of a first process which reduces the influence of noise included in the detection data output from the sensor unit and inputs the detection data to the positional data calculation unit and a second process which reduces the influence of noise included in the positional data output from the positional data calculation unit; and
   a noise amount calculation unit configured to calculate an amount of noise included in the detection data,
   wherein the filter unit changes a processing method in at least one of the first process and the second process, depending on the amount of noise calculated by the noise amount calculation unit, such that an amount of reduction in the influence of the noise increases as the amount of noise increases and decreases as the amount of noise decreases;
   wherein the filter unit performs at least one of a first low-pass filtering process which attenuates the noise included in the detection data output from the sensor unit and inputs the detection data to the positional data calculation unit and a second low-pass filtering process which attenuates the noise included in the positional data output from the positional data calculation unit, and
   the filter unit changes noise attenuation characteristics of at least one of the first low-pass filtering process and the second low-pass filtering process, depending on the amount of noise calculated by the noise amount calculation unit, such that the attenuation of the noise increases as the amount of noise increases and decreases as the amount of noise decreases;

wherein the filter unit calculates a processing result of a new low-pass filtering process, on the basis of an addition result of a value, which is obtained by multiplying at least one previous target value among a series of target values to be subjected to the new low-pass filtering process by a first weight coefficient, and a value obtained by multiplying a previous processing result of the new low-pass filtering process by a second weight coefficient, in at least one of the first low-pass filtering process and the second low-pass filtering process, the filter unit increases the second weight coefficient relative to the first weight coefficient as the amount of noise increases and decreases the second weight coefficient relative to the first weight coefficient as the amount of noise decreases, on the basis of the amount of noise calculated by the noise amount calculation unit.

2. The input device according to claim 1, further comprising:

a sensor control unit, wherein the sensor unit includes:

a detection electrode configured to form a capacitor whose capacitance is changed depending on the approach state of the object;

a driving unit configured to apply a driving voltage to the capacitor; and a detection data generation unit configured to generate a plurality of respective detection data items, each respective data item corresponding to a charge which is transmitted in the detection electrode when the capacitor is charged or discharged with the application of respective driving voltage, the noise amount calculation unit calculates the amount of noise on the basis of a difference between the plurality of detection data items, and when the plurality of detection data items used to calculate one amount of noise are generated, the sensor control unit sets an application condition of the driving voltage in the driving unit during the generation of each of the respective detection data items such that substantially the same amount of charge is transmitted in the detection electrode when no noise is input to the detection electrode.

3. The input device according to claim 2, wherein the sensor unit includes a plurality of driving electrodes, the capacitors are formed between the detection electrode and the plurality of driving electrodes, when the detection data used to calculate the positional data is generated, the sensor control unit controls the driving unit such that one driving electrode is sequentially selected from the plurality of driving electrodes and the driving voltage is applied to the capacitor formed between the selected one driving electrode and the detection electrode, and when the detection data used to calculate the amount of noise is generated, the sensor control unit controls the driving unit such that the driving voltage common to a plurality of the capacitors formed between at least some of the plurality of driving electrodes and the detection electrode is applied or at least some of the plurality of driving electrodes are in a floating state.

4. The input device according to claim 2, wherein, when the detection data used to calculate the amount of noise is generated, the sensor control unit controls the driving unit such that the driving voltage is constantly maintained.

5. The input device according to claim 2, wherein the sensor unit includes a plurality of the detection electrodes, and the noise amount calculation unit calculates the amount of noise corresponding to the difference between the plurality of detection data items, which are generated in order to calculate the amount of noise, for each of the plurality of detection electrodes and selects a maximum value among the calculated plurality of amounts of noise as the calculation result of the amount of noise.

6. The input device according to claim 2, further comprising:

a sampling frequency selection unit, wherein, when the detection data used to calculate the positional data is generated, the sensor control unit controls the driving unit such that the driving voltage is changed at a constant frequency and controls the detection data generation unit such that the charge transmitted in the detection electrode is sampled in synchronization with a change in the driving voltage and the detection data corresponding to the sampling result is generated, when the detection data used to calculate the amount of noise is generated, the sensor control unit controls the detection data generation unit such that the charge transmitted in the detection electrode is sampled at a constant frequency and the detection data item corresponding to the sampling result is generated, the sensor control unit controls the detection data generation unit such that an operation for generating the detection data used to calculate the amount of noise is performed for each of a plurality of sampling frequencies a plurality of times, the noise amount calculation unit calculates the amount of noise for each of the plurality of sampling frequencies, on the basis of the plurality of detection data items which are generated for each of the plurality of sampling frequencies, the sampling frequency selection unit selects a sampling frequency with the smallest amount of noise, on the basis of the amounts of noise which are calculated for each of the plurality of sampling frequencies, the filter unit changes the attenuation characteristics, depending on the amount of noise which is calculated for the sampling frequency selected by the sampling frequency selection unit, and when the detection data used to calculate the positional data is generated, the sensor control unit controls the driving unit such that the driving voltage is changed at the sampling frequency selected by the sampling frequency selection unit.

7. The input device according to claim 2, wherein the noise amount calculation unit averages the amounts of noise which are repeatedly calculated, and the filter unit changes the attenuation characteristics on the basis of the average amount of noise calculated by the noise amount calculation unit.

8. The input device according to claim 2, wherein the sensor control unit controls the detection data generation unit such that an operation for generating the detection data used to calculate the amount of noise is performed for each of a plurality of sampling frequencies a plurality of times over a constant period, and wherein the sensor control unit controls the driving unit and the detection data generation unit such that the detection data item used to calculate the positional data is generated for each constant period and an operation for generating the plurality of detection data items used to calculate one amount of noise is performed at least once for each constant period, and the noise amount calculation unit calculates at least one amount of noise for each constant period, on the basis of the plurality of detection data items which are generated for each constant period by the detection data generation unit.

\* \* \* \* \*